US006960331B2

(12) United States Patent
Barker et al.

(10) Patent No.: US 6,960,331 B2
(45) Date of Patent: Nov. 1, 2005

(54) METHODS OF MAKING LITHIUM METAL CATHODE ACTIVE MATERIALS

(75) Inventors: Jeremy Barker, Shipton-Under-Wychwood (GB); M. Yazid Saidi, Henderson, NV (US); Jeffrey Swoyer, Henderson, NV (US)

(73) Assignee: Valence Technology, Inc., Henderson, NV (US)

( * ) Notice: Subject to any disclaimer, the term of this patent is extended or adjusted under 35 U.S.C. 154(b) by 49 days.

(21) Appl. No.: 10/683,643

(22) Filed: Oct. 9, 2003

(65) Prior Publication Data

US 2004/0126300 A1 Jul. 1, 2004

Related U.S. Application Data

(63) Continuation of application No. 09/724,085, filed on Nov. 28, 2000, now Pat. No. 6,645,452.

(51) Int. Cl.$^7$ .............................................. C01B 15/16
(52) U.S. Cl. ...................................... 423/306; 423/464
(58) Field of Search ................................ 423/609, 610, 423/62, 179.5, 306, 464, 441, 593.1, 312; 502/350; 424/44, 52, 57

(56) References Cited

U.S. PATENT DOCUMENTS

| | | | |
|---|---|---|---|
| 2,508,878 | A | 5/1950 | Yates et al. |
| 2,570,232 | A | 10/1951 | Hansging |
| 3,736,184 | A | 5/1973 | Dey et al. |
| 3,865,745 | A | 2/1975 | Block et al. |
| 4,009,092 | A | 2/1977 | Taylor |
| 4,049,891 | A | 9/1977 | Hong et al. |
| 4,177,060 | A | 12/1979 | Tylko |
| 4,260,668 | A | 4/1981 | Lecerf et al. |
| 4,427,652 | A | 1/1984 | Gaffar |
| 4,434,216 | A | 2/1984 | Joshi et al. |
| 4,460,565 | A | 7/1984 | Weststrate et al. |
| 4,512,905 | A | 4/1985 | Clearfield et al. |
| 4,683,181 | A | 7/1987 | Armand et al. |
| 4,690,877 | A | 9/1987 | Gabano et al. |
| 4,707,422 | A | 11/1987 | de Neufville et al. |
| 4,828,833 | A | 5/1989 | Cordon |
| 4,985,317 | A | 1/1991 | Adachi et al. |
| 5,232,794 | A | 8/1993 | Krumpelt et al. |
| 5,240,794 | A | 8/1993 | Thackeray et al. |
| 5,262,548 | A | 11/1993 | Barone |
| 5,281,496 | A | 1/1994 | Clarke |
| 5,296,436 | A | 3/1994 | Bortinger |
| 5,316,877 | A | 5/1994 | Thackeray et al. |
| 5,384,291 | A | 1/1995 | Weimer et al. |
| 5,512,214 | A | 4/1996 | Koksbang |
| 5,514,490 | A | 5/1996 | Chen et al. |
| 5,607,297 | A | 3/1997 | Henley et al. |
| 5,683,835 | A | 11/1997 | Bruce |
| 5,803,947 | A | 9/1998 | Engell et al. |
| 5,871,866 | A | 2/1999 | Barker et al. |
| 5,910,382 | A | 6/1999 | Goodenough et al. |
| 6,085,015 | A | 7/2000 | Armand et al. |

FOREIGN PATENT DOCUMENTS

| | | |
|---|---|---|
| EP | 0 680 106 A1 | 11/1995 |
| EP | 1 049 182 A2 | 11/2000 |
| EP | 1 094 532 A1 | 4/2001 |
| EP | 1094533 A1 | 4/2001 |
| JP | 56162477 | 12/1981 |
| JP | 61 263069 | 11/1986 |
| JP | 62176054 | 8/1987 |
| JP | 9134724 | 5/1997 |
| JP | 9134725 | 5/1997 |
| JP | 2001-08-5010 | 3/2001 |
| JP | 2001-11-0414 | 4/2001 |
| RU | 2038395 | 6/1995 |
| WO | WO 98/12761 | 3/1998 |
| WO | WO/01024 | 1/2000 |
| WO | WO 00/57505 | 9/2000 |
| WO | WO 01/53198 | 7/2001 |
| WO | WO 01/54212 | 7/2001 |

OTHER PUBLICATIONS

International Search Report for PCT/US97/15544.
Rangan et al., "New Titanium–Vanadium Phosphates of Nasicon and Langbeinite Structures and Differences Between the Two Structures Toward Deintercalation of Alkali Metal," Journal of Solid State Chemistry, 109 (1994) pp. 116–121.
Delmas et al., "The Nasicon–Type Titanium Phosphates ATi$_2$(PO$_4$)$_3$ (A=Li, Na) as Electrode Materials," Solid State Ionics (1988) 28–30 pp. 419–423.
Hagenmuller et al., "Intercalation in 3D–Skeleton Structures: Ionic and Electronic Features," Material Resources Society Symposium Proc., vol. 210 (1991) pp. 323–334.
Padhi et al., "Lithium Intercalation into NASICON–Type Mixed Phosphates: . . . and Li$_2$FeTi(PO$_4$)$_3$," 37$^{th}$ Power Sources Conference, Cherry Hill, New Jersey, Conference Data, Jun. 17–20, 1996, published Oct. 15, 1996.
Sisler et al., "Chemistry A systemic Approach," Oxford University Press, p. 746, 1980.
Gopalakrishnan et al., "V$_2$(PO$_4$)$_3$: A Novel NASICON–Type Vanadium Phosphate Synthesized by Oxidative Deintercalation of Sodium from Na$_3$V$_2$(PO$_4$)$_3$," Chemistry of Materials, vol. 4, No. 4, Jul./Aug. 1992, pp. 745–747.

(Continued)

Primary Examiner—Edward M. Johnson
(74) Attorney, Agent, or Firm—Cynthia S. Kovacevic; Roger A. Williams; Michael D. Ross

(57) ABSTRACT

The invention provides a novel method for making lithium mixed metal materials in electrochemical cells. The lithium mixed metal materials comprise lithium and at least one other metal besides lithium. The invention involves the reaction of a metal compound, a phosphate compound, with a reducing agent to reduce the metal and form a metal phosphate. The invention also includes methods of making lithium metal oxides involving reaction of a lithium compound, a metal oxide with a reducing agent.

35 Claims, 9 Drawing Sheets

OTHER PUBLICATIONS

Delmas et al., "The Chemical Short Circuit Method, An Improvement in the Intercalation–Deintercalation Techniques," Materials Research Bulletin, vol. 23, 1988, pp. 65–72.

Ivanov–Schitz et al., "Electrical And Interfacial Properties of a $Li_3Fe_2(PO_4)_3$ Single Crystal With Silver Electrodes," Solid State Ionics, 91, (1996), pp. 93–99.

Cretin et al., "Study Of $Li_{2+x}Al_xTi_{2-x}(PO_4)_3$ for Li+ Potentiometric Sensors," Journal of the European Ceramic Society, 15, (1995) pp. 1149–1156.

Patent Abstracts of Japan (1994) vol. 18, No. 64, (Abstract for JP 06251764).

Okada et al., Center for Materials Science & Engineering, University of Texas, Austin, Texas, "$Fe_2(SO_4)_3$ as a Cathode Material for Rechargeable Lithium Batteries."

Adachi et al., "Lithium Ion Conductive Solid Electrolyte," Chemical Abstracts 112 129692 (1981).

Delmas et al., "A Nasicon–Type Phase as Intercalation Electrode: Sodium Titanium Phosphate ($NaTi_2(PO_4)_3$)," Material Resources Bulletin (1987).

Nanjundaswamy et al., "Synthesis, redox potential Evaluation and Electrochemical Characteristics of NASICON–Related–3D Framework Compounds," Solid State Ionics, 92, (1996) pp. 1–10.

Nadiri, "Lithium Intercalation in Lithium Titanium Phosphate ($LiTi_2(PO_4)_3$)," C.R. Acad. Sci. Ser. 2 (1987), 304(9), pp 415–418.

Cotton et al., "Advanced Inorganic Chemistry," $3^{rd}$ Edition, Interscience Publishers, pp. 864–868.

Linden, "Handbook of Batteries," $2^{nd}$ Edition, McGraw–Hill, Inc. pp36.4–36.9.

Bykov et al., Superionic Conductors $Li_3M_2(PO_4)_3$ (M=Fe, Sc, Cr): Synthesis, Structure and Electrophysical Properties, Solid State Ionics, vol. 38 (1990) pp. 31–52.

Gummow, et al., "Lithium Extraction from Orthorhombic Lithium Manganese Oxide and the Phase Transformation to Spinel," Materials Research Bulletin (1993), 28(12), 1249–56.

Gummow, et al., "An Investigation of Spinel–Related and Orthorhombic $LiMnO_2$ Cathodes for Rechargeable Lithium Batteries," J. Electrochem. Soc. (1994), 141(5), 1178–82.

Otsuka, et al., "Hydrogen Production from Water by Indium (III) Oxide and Potassium Carbonate Using Graphite, Active Carbon and Biomass as Reductants," Chem. Lett. (1981), (3), 347–50.

Vasyutinskii, "Appearance of EMF During Ferric Oxide Reduction by Carbon," Zh. Prikl. Khim, (1973) 46(4), 779–82 (Abstract).

Gilchrist, Extraction Metallurgy, Pergamon Press (1980, pp. 160–173.

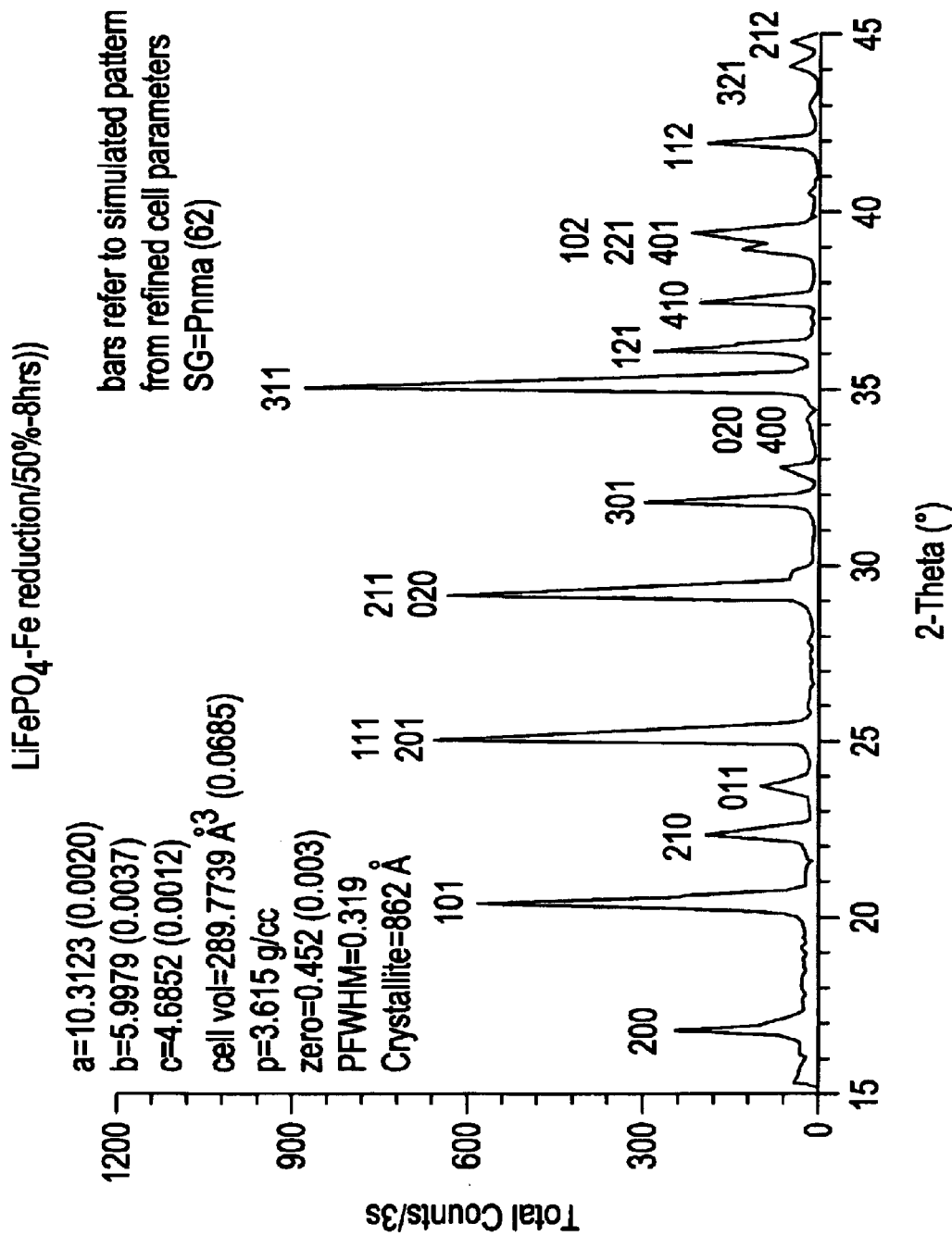

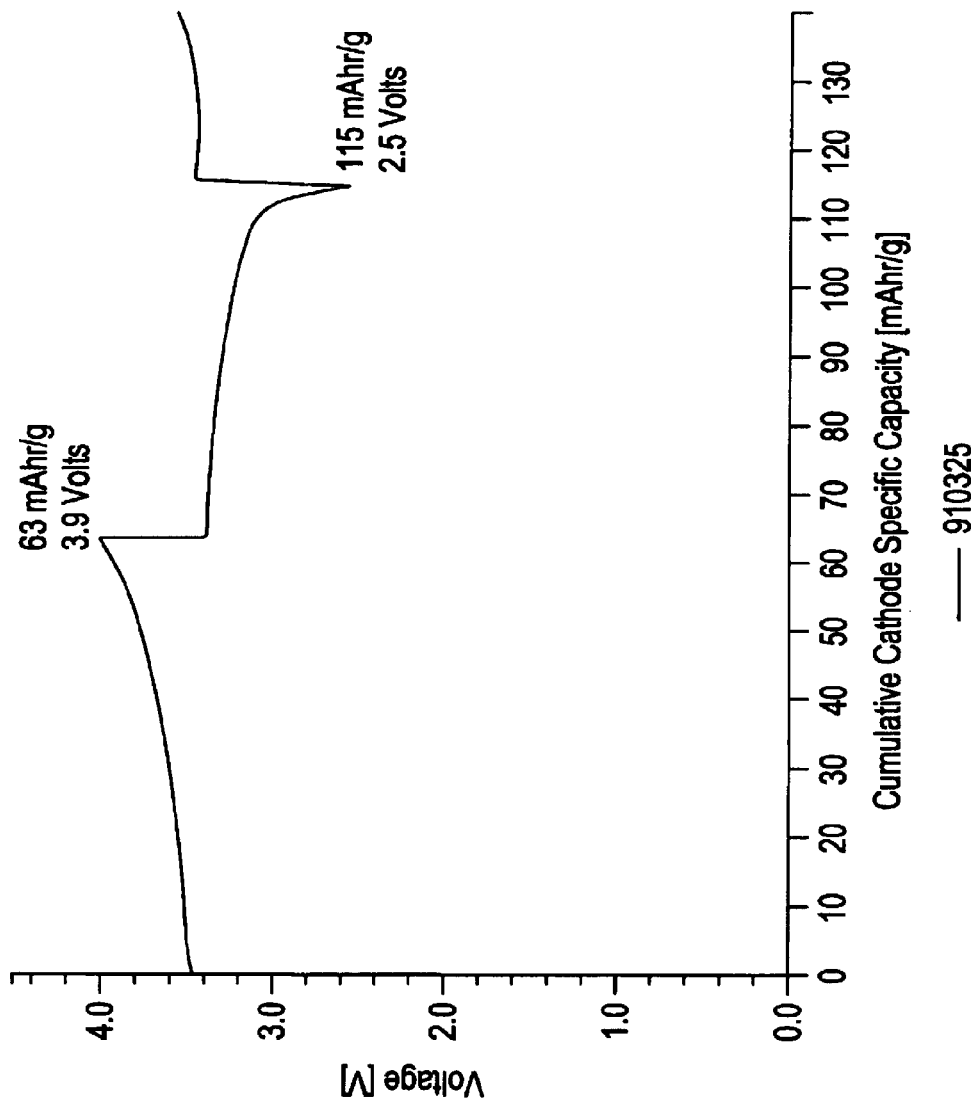

METHODS OF MAKING LITHIUM METAL CATHODE ACTIVE MATERIALS

This application is a continuation of U.S. Ser. No. 09/724,085 filed Nov. 28, 2000, now U.S. Pat. No. 6,645,452.

FIELD OF THE INVENTION

This invention relates to methods for producing electrode active materials which can be used to formulate electrodes for use in electrochemical cells in batteries. More particularly, the present invention relates to methods for the production of electrode active lithium metal phosphate materials. Even more particularly, the present invention relates to methods whereby electrode active materials having unique triclinic or olivine crystalline structures can be produced.

BACKGROUND OF THE INVENTION

Lithium batteries have become a useful and desirable energy source in recent years. Generally speaking lithium batteries are prepared from one or more lithium electrochemical cells containing electrochemically active (electroactive) materials. Such cells typically include an anode (negative electrode), a cathode (positive electrode), and an electrolyte interposed between spaced apart positive and negative electrodes. Batteries with anodes of metallic lithium and containing metal chalcogenide cathode active material have received acceptance in industry and commerce.

By convention, during discharge of the cell, the negative electrode of the cell is defined as the anode. Cells having a metallic lithium anode and metal chalcogenide cathode are charged in an initial condition. During discharge, lithium ions from the metallic anode pass through a liquid electrolyte to the electrochemically active (electroactive) material of the cathode whereupon they release electrical energy to an external circuit.

It has recently been suggested to replace the lithium metal anode with an insertion anode, such as a lithium metal chalcogenide, lithium metal oxide, coke or graphite. These types of electrodes are typically used with lithium-containing insertion cathodes to form an electroactive couple in a cell. The resulting cells are not charged in an initial condition. Before this type of cell can be used to deliver electrochemical energy, it must be charged. In the charging operation, lithium is transferred from the lithium-containing cathode to the anode. During discharge the lithium is transferred from the anode back to the cathode. During a subsequent recharge, the lithium is transferred back to the anode where it reinserts. Thus with each charge/discharge cycle, the lithium ions ($Li^+$) are transported between the electrodes. Such rechargeable batteries, having no free metallic species, are called rechargeable ion batteries or rocking chair batteries. See U.S. Pat. Nos. 5,418,090; 4,464,447; 4,194,062; and 5,130,211.

Various materials have been suggested and employed as the cathode material in the aforementioned batteries. Preferred-positive electrode active materials generally include $LiCoO_2$, $LiMn_2O_4$, and $LiNiO_2$. These materials are synthesized by a variety of synthesis modes which can generally be classified as "wet method synthesis". Methods of making lithium compounds are described in U.S. Pat. No. 5,135,732 by Barbus, et al. and U.S. Pat. No. 4,246,253 by Hunter, and involve the formation of aqueous solutions as intermediate steps. Lithium compounds containing cobalt are relatively expensive to synthesize due to the intermediates required, while successful synthesis of lithium-nickel compounds is relatively complex and difficult. Lithium-manganese compounds, such as $LiMn_2O_4$, are generally more economical to synthesize than the preceding material and result in a relatively economical positive electrode.

Unfortunately all of the foregoing materials have inherent drawbacks when employed as electroactive materials in electrochemical cells. Cells employing each of the foregoing materials in the cathode experience significant loss of-charge capacity over repeated charge/discharge-cycles, commonly-referred to as cycle fading. The initial capacity available (amp hours/gram) from materials, such as $LiMn_2O_4$, $LiNiO_2$, and $LiCoO_2$, is less than the theoretical capacity because-significantly less than 1 atomic unit of lithium engages in the electrochemical reaction. This initial capacity value is significantly diminished during the first cycle of operation and diminishes even further on every successive cycle of operation. Thus for $LiNiO_2$ and $LiCoO_2$ only about 0.5 atomic units of lithium is reversibly cycled during cell operation.

Many attempts have been made to reduce capacity fading, for example, as described in U.S. Pat. No. 4,828,834 by Niagara et al. However, the presently known and commonly used, alkali transition metal oxide compounds suffer from relatively low capacity. Therefore, there remains the difficulty of obtaining a lithium-containing electrode material having acceptable capacity without the disadvantage of significant capacity loss when used in a cell.

In related applications, U.S. Ser. Nos. 09/204,944 and 09/559,861 which are currently pending before the United States Patent and Trademark Office, the inventors have disclosed novel lithium metal phosphate and lithium metal fluorophosphate materials which address concerns such as cycle fading and the like. However, there remains a long-felt and, as yet, unsatisfied need for providing an economical and reproducible synthesis method for such phosphate-containing materials which will provide good quality material in suitable yields.

SUMMARY OF THE INVENTION

This invention provides a method of making lithium metal phosphate compounds suitable for use as active materials in electrodes. In the method of the present invention, the various materials utilized are in, particulate form and include at least one metal compound and at least one phosphate compound. These materials are present as solid particulate materials and are admixed in the presence of a reducing agent at a suitable reaction temperature in an appropriate non-oxidizing environment. The particulate metal, particulate phosphate and reducing agent remain in contact with one another for an interval and at a temperature sufficient to form a particulate metal phosphate reaction product. The resulting metal phosphate reaction product characteristically contains a metal ion derived from the particulate metal compound and a phosphate ion derived from the particulate phosphate compound.

The resulting metal phosphate reaction product is reacted with a source of lithium ions in a manner sufficient to form a lithium metal phosphate reaction product.

In more specific embodiments of the present invention, there is provided novel methods of making lithium-metal-fluorophosphate materials; new materials which, upon electrochemical interaction, release lithium ions, and are capable of reversibly cycling lithium ions. Such materials can be employed in various ways, including but not limited to, use in a rechargeable lithium battery which comprises an electrolyte; a first electrode having a compatible active material; and a second electrode comprising the novel lithium-metal-fluorophosphate materials. Lithium-metal-fluorophosphate materials produced by the process of the present invention can be represented by the nominal general formula $LiM_{1-y}MI_yPO_4F$ where $0 \leq y \leq 1$. Such compounds include $LiMPO_4F$ for y=0. Such compounds are also represented by $Li_{1-y}MPO_4F$ and $Li_{1-x}M_{1-y}MI_yPO_4F$, where in an initial condition, "x" is essentially zero; and during cycling a quantity of "x" lithium is released where $0 \leq x \leq 1$. Correspondingly, M has more than one oxidation state in the lithium metal fluorophosphate compound, and more than one oxidation state above the ground state $M^0$. The terms oxidation state and valence state are used in the art interchangeably.

Broadly construed, the method of making lithium metal phosphate materials of the present invention utilizes precursor materials in particulate or powder form. The terms powder, particle, and particulate are used interchangeably herein. Particulate starting materials include a phosphate compound, at least one metal compound, in intimate admixture with one another and in intimate contact with a reducing agent. The reducing agent, optionally, can be a metal in its elemental state. The admixture and reducing agent of the starting materials is heated under conditions which do not support oxidation. The reaction temperature and interval are generally defined as those sufficient to form a reaction product comprising the metal and the phosphate. The starting material may comprise more than one metal compound provided that at least one of the metal compounds employed is a transition metal compound.

The resulting metal phosphate compound is mixed with a lithium compound. The resulting mixture is then heated at a sufficient temperature and for a sufficient time to form a reaction product comprising the metal phosphate and the lithium having the nominal general formula: $LiM_{1-y}MI_yPO_4$ where $0 \leq y \leq 1$. Such compounds include $LiMPO_4$ for y=0.

In order to produce the lithium metal fluorophosphate material, the resulting metal phosphate produced as above can be admixed with a fluorine-containing lithium compound. The resulting admixture is then heated at a sufficient temperature and for a sufficient time to form a reaction product comprising the metal phosphate, the lithium and fluorine. It is also considered within the purview of this invention to utilize particulate metal phosphate materials derived from other synthetic methods in admixture with materials such as lithium fluoride to produce a lithium metal fluorophosphate.

These and other objects, features, and advantages will become apparent from the following description of the preferred embodiments, claims, and accompanying drawings.

BRIEF DESCRIPTION OF THE DRAWINGS

FIG. 9 shows the results of an x-ray diffraction analysis, of $LiFePO_4$ prepared as above, using CuKα radiation, a=1.5404 Å. Bars refer to simulated pattern from refined cell parameters SG=Pnma (62). The values are a=10.3123 Å (0.002), b=5.9979 Å (0.0037), C=4.6852 Å (0.0012); cell volume=289.7730 (0.0685)Å$^3$.

FIG. 10 is a voltage/capacity plot of $LiFePO_4$ containing cathode cycled with a lithium metal anode in a range of 2.5 to 3.9 volts. The cathode contained 10.7 mg of $LiFePO_4$ active material prepared by the method described above.

DETAILED DESCRIPTION OF THE PREFERRED EMBODIMENTS

Figure 1:
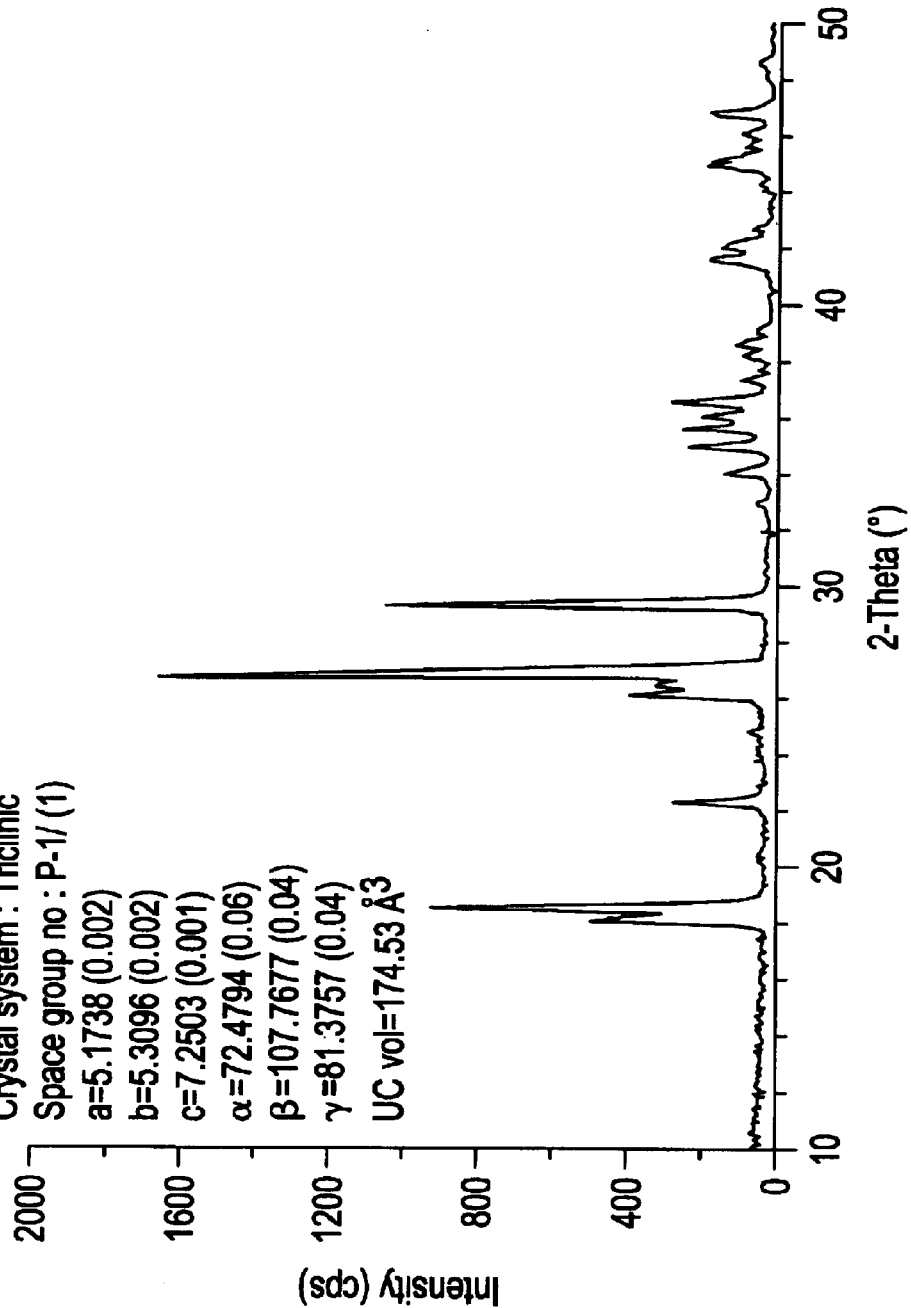
FIG. 1 presents the results of an x-ray diffraction analysis, of $LiVPO_4F$ prepared as above, using CuKα radiation, a=1.5404 Å. Bars refer to simulated pattern from refined cell parameters SG=P-1 (triclinic) (1). The values are a=5.1738 Å (0.002), b=5.3096 Å (0.002), c=7.2503 Å (0.001); the angle a=72.4794 (0.06), a=107.7677 (0.04), a=81.3757 (0.04), cell volume=174.53 Å$^3$. The crystal system is triclinic.

The present invention is a method for producing lithium metal phosphates, including lithium metal fluorophosphate, useful as electrode active materials. Such materials permit and facilitate lithium ion extraction and reinsertion when employed as part of an electrode in a suitable electrochemical cell to achieve significant capacity. Extraction of lithium ion from a material, such as lithium-metal-fluorophosphate, result in generation of electrochemical energy when the material is present in a suitable electrochemical cell denoted as extraction of a quantity x of lithium from lithium-metal-fluorophosphate $Li_{1-x}M_{1-y}MI_yPO_4F$ when 0 is less than or equal to y is less than or equal to 1. When a quantity of lithium is removed per formula unit of the lithium-metal-fluorophosphate, metal M is oxidized. Accordingly, during cycling, charge and discharge, the value of x varies as x greater than or equal to 0 and less than or equal to 1.

In the method of the present invention, suitable precursor materials are intimately admixed in the presence of a suitable reducing agent in a suitable environment which will not support appreciable oxidation. The materials are reacted at a temperature and for an interval sufficient to result in a metal phosphate reaction product. This metal phosphate reaction product is, then, admixed with a suitable source of lithium and reacted at a temperature and for an interval sufficient to produce a lithium metal phosphate reaction product.

Suitable starting materials for producing a lithium metal phosphate reaction product useful in the process of the present invention will include at least one metal compound and at least one phosphate compound. It is within the purview of the present invention to include a second metal compound in the starting materials. The second metal compound, where employed, may be the same as or different from the metal mentioned above. The resulting lithium metal phosphate reaction product will contain at least one metal ion derived from the metal compound employed as a starting material and at least one phosphate compound employed as the phosphate starting material.

Starting materials employed in the process of the present invention are solids present as dry particulate. In the process of the present invention, the metal compound and phosphate compound may be present in any ratio which will support the formation of the metal phosphate reaction product. Generally speaking, the ratio of metal compound to phosphate will be such that equimolar amounts of metal in the metal compound to phosphate in the phosphate compound are provided. Thus, in situations where two molecules of metal are-present per molecule of metallic compound, the amount of metallic compound will be stoichiometrically equal to the available phosphate ions.

The particulate material generally has a granule size suitable for permitting and promoting the reaction yielding the metal phosphate reaction product of the present invention. Generally the particulate starting materials will have a particle size less than about 500 micrometers with a particle size less than about 200 micrometers being preferred. The various starting material compounds do not have to be of identical grain size, however the various materials should have sizes which will permit the reaction to proceed.

In order to obtain particulate material of suitable grain size, it is within the purview of the process of the present invention to admix the two materials and subject the admixed materials to a suitable granulation process to form particulate material of the desired size. In the process of the present invention, the materials were admixed and granulated in a ball-mill. The granulated materials may be homogeneously admixed and formed into pellets by any suitable process.

In the process of the present invention, the first metal compound choice is selected from the group transition metals; oxides of transition metals; carbonates of transition metals; and mixtures thereof. The transition metal of choice is selected from the group consisting of Fe, Co, Ni, Mn, Cu, V, Ti, Cr, and mixtures thereof. Preferably the metal of choice is selected from the group consisting of Fe, Co, Ni, Mn, Cu, and V.

Where a second metal-compound is employed in the process of the present invention, the second metal may be the same or different form the first metal. Thus where a second metal compound is utilized, it may be selected from the group consisting of transition metals; oxides of transition metals; carbonates of transition metals; non-transition metals; oxides of non-transition metals; carbonates of nonetransition metals; and mixtures thereof. The transition metals are those selected from the group consisting of Fe, Co, Ni, Mn, Cu, V, Ti, Cr, and mixtures thereof. The non-transition metals are those selected from the group consisting of Mg, Ca, Zn, Sr, Pb, Cd, Sn, Ba, Be, Al, B, and mixtures thereof.

The phosphate compound employed as the starting materials is one capable of existing as a solid particulate material. The phosphate material of choice is preferably a phosphoric acid derivative such as a phosphoric acid ammonium salt. Preferably the phosphate material of choice is selected from the group-consisting of diammonium hydrogen phosphate (DAHP), ammonium dihydrogen phosphate (ADHP), and mixtures thereof.

In the process of the present invention, the particulate starting materials are admixed in suitable ratio in the presence of a reducing agent and at a suitable reaction temperature in a non-oxidizing environment. The particulate metal compound, particulate phosphate and reducing agent remain in contact with one another for an interval and at a temperature sufficient to form a particulate metal phosphate reaction product. The resulting metal phosphate reaction product characteristically contains a metal ion derived from the particulate metal compound and a phosphate ion derived from the particulate phosphate compound.

The reducing agent employed in the process of the present invention may be any suitable material which will reduce the transition metal during the formation of the metal phosphate compound. Any reducing agent capable of reducing the transition metal may theoretically be employed as the reducing agent of choice in the formation of metal phosphate reaction product from the process of the present invention. However, it is preferred that the reducing agent be selected from the group consisting of hydrogen, carbon, elemental metals, and mixtures thereof. Where gaseous reducing agent is employed, the gaseous reducing agent is introduced into contact with the pelletized starting material at a rate sufficient to provide ample reducing agent to maintain the concentration of reducing agent and the associated reaction process. Advantages of hydrogen include the removal of unwanted products in a gaseous form during the reaction process, leaving behind the desired solid product.

Alternately, the reducing agent may be a solid material such as carbon, silicon oxide (SiO), titanium (TiO), or elemental metals. Generally, excess amounts of the reducing agent are used to insure the reaction goes to completion. When the reducing agent is carbon, unwanted carbon monoxide or carbon dioxide are removed as a gaseous byproduct. Any unreacted carbon can be incorporated into the cathode, and will remain with the electrode active material. Carbon is added in the formation of electrodes as an appropriate conductive material and therefore any remaining carbon need not be removed. Elemental metals can be used also as reducing agents. Preferably, the elemental metal is the same metal as found in the metal compounds for the formation of the metal phosphates, and can be incorporated directly into the active material formed, i.e., the metal phosphate. As an alternative, the elemental metal chosen is one which is desired to be incorporated into the active material.

In the process of the present invention, the reaction occurs in a non-oxidizing environment. Where solid reducing agents are employed, a suitable environment can be achieved by performing the process under a blanket of inert gas such as a gas selected from the group consisting of argon, nitrogen, and mixtures thereof. It is also within the purview of the method of the present invention to achieve a non-oxidizing environment by limiting the amount of oxygen available throughout the reaction to a concentration below that which interferes or competes with the primary reduction reaction. This can be achieved in numerous ways, such as by restricting the amount of replacement oxygen available in a covered container or the like.

The temperature sufficient to promote formation of the metal reaction product is generally one which falls between about 500° C. and below the melting point of the metal phosphate, with a reaction temperature between about 700° C. and about 1200° C. being preferred. The preferred reaction temperatures will vary depending on the choice of metal for metal phosphate formation, as well as dwell time chosen. Reaction at the specified temperatures preferably occurs with gradual temperature elevation at the outset of the process. Generally, starting materials are held at a temperature at or near ambient when the reaction commences with a suitable temperature elevation occurring over an initial interval until the desired peak temperature is reached. Temperature ramp rates between a fraction of 1° C./minute and about 10° C./minute can be successfully employed in the process of the present invention, with ramp rates between about 1° C./minute and about 5° C./minute being preferred and between about 1° C./minute and about 3° C./minute being most preferred.

Once the maximum desired reaction temperature has been achieved, the pellets of particulate material are maintained at or near the desired reaction temperature for an interval sufficient to permit production of the metal phosphate reaction product. This interval can vary depending upon other variables in the reaction process. However, the reaction interval at temperature is generally between about 10 minutes and many hours, with an interval between about 6 hours and about 8 hours being preferred. The preferred time will depend on the choice of metal for production of metal phosphate as well as choice of temperature of reaction and choice of reaction precursors.

Once the reaction interval is complete, the material is permitted to cool to ambient temperature. If desired or required, the pelletized material can be re-ground and reformed into pellets. The reaction process can be repeated in this fashion for sufficient iterations to ensure proper and complete reaction.

The heating process of the present invention may also include an optional preheating reaction phase in which pelletized, homogeneously blended starting materials are initially brought to a first temperature level which is at or below the second or final temperature elevation level. When a preheating temperature elevation reaction process is employed, it is anticipated that the pelletized homogeneously blended particulate starting materials will be brought to a first elevated temperature between about 100° C. and about 500° C., with a temperature between about 250° C. and about 400° C. being preferred and with a temperature between about 250° C. and about 350° C. being most preferred.

The pellets are then allowed to cool to ambient, are ground and re-pelletized. The newly formed pellets are then re-heated to a second elevated temperature greater than the first elevated temperature, with the second elevated temperature generally being in a range between about 500° C. and below the melting point of the metal phosphate, with a temperature between about 700° C. and about 1200° C. being preferred and with a temperature between about 700° C. and about 900° C. being most preferred.

In the multi-temperature heating and reaction step, as in the single temperature elevation process, the temperature elevation is accomplished at a ramp rate between about a fraction of 1° C./minute and about 10° C./minute with ramp rates between about 1° C./minute and about 5° C./minute being preferred and ramp rates between about 1° C./minute and about 3° C./minute being most preferred. Similarly, cooling may occur at any suitable controlled rate. Generally, cooling proceeds at a rate between about 1° C./minute and about 100° C./minute with cooling rates between about 10° C./minute and about 60° C./minute being preferred and cooling rates between about 40° C./minute and about 50° C./minute being most preferred.

Although, general parameters have been specified, the following general guidelines provide illustrative reactions and processes for the formation of the cathode active materials.

Lithium Mixed Metal fluorophosphate:

In the case of lithium mixed metal fluorophosphate, a preferred approach is a two staged approach. The lithium mixed metal fluorophosphates are compounds produced by this invention having a triclinic crystalline structure. With the two staged approach, the first stage involves the production of a metal phosphate, followed by a second stage wherein the metal phosphate is reacted with a lithium compound and a fluoride compound to produce a lithium metal fluorophosphate. The first stage is also a stand alone process for fabricating transition metal phosphate compounds for use as precursors in the further fabrication of cathode active materials. The basic procedure is described with reference to illustrative starting materials, but is not limited thereby. The first stage involves admixing and reacting the starting materials at an elevated temperature for a period of time sufficient to carry the reaction to completion. The first stage process involves intimately admixing the starting materials in particle form. The starting materials can be finely ground and then admixed, or admixed while being finely ground. The grinding and admixing is of sufficient duration to produce a uniform finely ground-powder. As an illustration, the starting materials can be admixed and ground in a ball mill for a period from a few minutes to several hours, with a preferred mixing time in a ball mill from about 10 minutes to about one hour, and with a most preferred mixing time in a ball mill of about 30 minutes.

The starting materials for the first stage include at least one transition metal compound, and at least one phosphate compound. The metal compounds include transition metal oxides and preferredly are selected from the group consisting of vanadium pentoxide ($V_2O_5$), ferric oxide ($Fe_2O_3$), titanium dioxide ($TiO_2$), chromium dioxide ($CrO_2$), and mixtures thereof. The phosphate compounds include phosphoric acid derivatives and, preferably, a compound selected from the group consisting of ammonium dihydrogen phosphate (ADHP), diammonium hydrogen phosphate (DAHP), or mixtures thereof. The materials are admixed in proportions on a molar basis of about one metal to one phosphate. The starting materials may also include a solid reducing agent. The solid reducing agent is finely ground and intimately admixed with the starting materials. The solid reducing agent is added in an amount greater than or equal to the stoichiometric amounts necessary for reduction. The solid reducing agents include elemental metals, carbon, and metalloids. Preferably, solid reducing agents are selected from the group consisting of Fe, Co, Ni, Mn, Cu, V, Ti, Cr, Nb, Mo, Mg, Ca, Zn, Sr, Pb, Cd, Sn, Ba, Be, Al, B, C, SiO, and mixtures thereof. The mixed powders were then pressed into pellets. Pelletization, while not necessary improves particle-particle contact, and simple compaction of the admixture may provide adequate interparticle contact.

The reaction was conducted by heating the pellets in an oven at a preferred ramped heating rate to an elevated temperature, and held at such elevated temperature for several hours in the presence of a reducing agent. A ramped heating rate of about 1° C./minute to about 20° C./minute can be employed, while a preferred ramp rate of about 2° C./minute is used to heat to an elevated temperature from about 250° C. to about 1200° C., and dwells for a period between 2 and 24 hours. A preferred approach was to preheat the reaction mixture for a period, re-grind the reactants, re-pelletize the reactants, and reheat and react the reactants at a second elevated temperature for several hours. With the preferred approach of preheating, the reaction mixture was heated to an elevated temperature from about 100° C. to about 500° C., with a preferred temperature of about 300° C. The reaction mixture is held at the elevated temperature from about two to about ten hours, with a preferred reaction time from about three to about eight hours. The reaction is carried out in the presence of a reducing agent. The reaction mixture is then cooled to ambient, re-ground, and re-pelletized. The pellet is reheated, and a ramped heating rate of about 1° C./minute to about 20° C./minute can be employed, while a preferred ramp rate of about 2° C./minute is used to heat to an elevated temperature from about 600° C. to about 1100° C. with a preferred elevated temperature in the range of about. 700° C. to about 850° C. The pellet is held at the elevated temperature for a time from about 2 to 10 hours, with a preferred time from about 6 to 8 hours. The reaction during the reheating step is carried out in the presence of a reducing agent. The pellet is cooled to ambient and reground leaving a metal phosphate powder.

The second stage of the lithium mixed metal fluorophosphate fabrication involves grinding to a fine powder the metal phosphate with a lithium compound and a fluoride compound. The lithium and fluoride compounds are admixed with the metal phosphate compound on roughly an equimolar basis. The mixture can be ground and admixed, or admixed and then ground to produce a uniform finely ground powder. A preferred admixing method is in a ball mill with a admixing time from about 10 minutes to about one hour, and with a most preferred admixing time in a ball mill of about 30 minutes. Lithium compounds include lithium carbonate and lithium fluoride, and fluorine compounds include ammonium fluoride and lithium fluoride with a preferred compound of lithium fluoride. The finely ground intimately admixed mixture is pressed into a pellet, and the pellet is heated-at a ramped heating rate of about 1° C./minute to about 20° C./minute can be employed, while a preferred ramp rate of about 2° C./minute is used to heat to an elevated temperature from about 400° C. to below the melting point of the metal phosphate, with a preferred temperature range from about 500° C. to about 1200° C., and with a most preferred elevated temperature of about 700° C. The pellet is held at the elevated temperature for a time from about 10 minutes to 2 hours, with a preferred time of about 15 minutes. The reaction during the second stage is carried out under a normal air atmosphere. However, the pellet is placed in a covered crucible to limit oxygen availability. Following the heating step, the pellet is cooled to ambient and re-ground. An advantage of the two stage method is the second stage produces a product without loss of weight, or very little production of waste products, resulting in a very pure compound.

As an alternative, the lithium metal fluorophosphate can be a lithium mixed metal fluorophosphate compound. The mixed metal compound is fabricated by mixing desired metal phosphate compounds in a desired ratio with the lithium and fluorine compounds during the second stage. The metal phosphate compounds being fabricated individually according to the first stage. Recent research has indicated that doping of materials with non-transition metals or other elements, such as boron, and particularly aluminum, tends to increase the operating voltage. Substitution of non-transition elements such as aluminum for transition metals tends to stabilize the structure-of cathode active materials. This may aid the stability and cyclability of the materials.

As an alternative to the two stage process for producing the lithium metal fluorophosphate, a single stage process is used. A mixture was made of at least one metal compound, for example a metal oxide, at least one phosphate compound, at least one lithium compound, and at least one fluoride compound. The list of compounds are as above for the first and second stages. The single stage process involves admixing and reacting the starting materials at an elevated temperature for a period of time sufficient to carry the reaction to completion. The starting materials are intimately admixed in particle form. The starting materials can be finely ground and then admixed, or admixed while being finely ground. The grinding and admixing is of sufficient duration to produce a uniform finely ground powder. As an illustration, the starting materials can be admixed and ground in a ball mill for a period from a few minutes to several hours, with a preferred mixing time in a ball mill from about 10 minutes to about one hour, and with a most preferred mixing time in a ball mill of about 30 minutes.

The finely ground mixture is pressed into a pellet, and heated to an initial elevated temperature at a controlled ramped heating rate. The ramped heating rate is from about 1° C./minute to about 20° C./minute, with a preferred rate from about 1° C./minute to about 5° C./minute, and a most preferred rate of about 2° C./minute. The initial elevated temperature is from about 100° C. to about 500° C., and is held at that temperature from about 2 to 12 hours, with a preferred elevated temperature of about 250° C. to about 350° C., and held at a preferred time of about 7 to 9 hours. The pellet is allowed to cool to ambient, re-ground, and reformed into a pellet. The reformed pellet is heated to a second elevated temperature at a controlled ramped heating rate. The ramped heating rate is from about 1° C./minute to about 20° C./minute, with a preferred rate from about 1° C./minute to about 5° C./minute, and a most preferred rate of about 2° C./minute. The initial elevated temperature is from about 500° C. to about 1200° C., and is held at that temperature from about 2 to 12 hours, with a preferred elevated temperature of about 800° C. to about 950° C., and held at a preferred time of about 7 to 9 hours. Following completion, the pellet is cooled to ambient, and re-ground, leaving a powder of the lithium metal fluorophosphate.

Lithium Metal Phosphates and Lithium Metal Oxides:

In addition to making lithium metal fluorophosphate, the present invention provides methods of making lithium metal phosphates and lithium metal oxides for use as cathode active materials. The lithium metal phosphates are materials having an olivine crystal structure and the lithium metal oxides are materials having an orthorhombic crystal structure. An important aspect of this method involves the use of metalloids, such as silicon oxide, and elemental metals as reducing agents.

Generally, the formation of lithium metal phosphates is performed with a one stage process. The particulate precursors are admixed and subject to a suitable grinding process. The particulate material is subject to a granulation process to produce material having a particle size below about 500 micrometers with a preferred size below about 200 micrometers.

In the process of the present invention, the first metal compound choice is selected from compounds of transition metals from the group consisting of Fe, Co, Ni, Mn, Cu, V, Ti, Cr, and mixtures thereof. The choice of metal compounds include oxides of these transition metals, phosphates of these transition metals, carbonates of these transition metals, and mixtures thereof. The metal compounds are admixed with a particulate lithium compound and a particulate phosphate compound. Preferred lithium compounds are lithium dihydrogen phosphate and lithium carbonate. The phosphate compound is selected from metal phosphate compounds, lithium dihydrogen phosphate, ammonium dihydrogen phosphate, diammonium hydrogen phosphate, and mixtures thereof.

Where a second metal compound is employed in the process, the second metal may be the same or different from the first metal. Thus where a second metal compound is utilized, it may be selected from the group consisting of transition metals; oxides of transition metals; carbonates of transition metals; non-transition metals; oxides of non-transition metals; carbonates of non-transition metals; and mixtures thereof. The transition metals are those selected from the group consisting of Fe, Co, Ni, Mn, Cu, V, Ti, Cr, and mixtures thereof. The non-transition metals are those selected from the group consisting of Mg, Ca, Zn, Sr, Pb, Cd, Sn, Ba, Be, Al, B, and mixtures thereof.

In the process of the present invention, the reaction occurs in a non-oxidizing environment. Where the solid reducing agents are employed, a suitable environment is achieved by performing the process under a blanketing inert gas. Examples of suitable inert gases for the process include nitrogen, and argon. The process can also be carried out in a closed environment, where the amount of oxidant in the blanketing gas is kept to a minimum and does not substantially compete or interfere with the reduction reaction.

The process of the present invention involves heating the pelletized precursors to an elevated temperature sufficient to promote the formation of the reaction product. The elevated temperature is from about 500° C. to about 1200° C. with a preferred elevated temperature between about 700° C. and about 950° C. and a elevated temperature between about 700° C. and about 800° C. being most preferred. Reaction at the specified temperatures occurs with the gradual temperature elevation at the outset of the process. The rate of heating the precursors is at a ramp rate from a fraction of 1° C. per minute to 10° C. per minute and preferably about 2° C. per minute. Once the maximum desired reaction temperature has been achieved, the pellets of particulate material are maintained at or near the desired elevated temperature for an interval sufficient to permit production of the lithium metal phosphate reaction product. This interval can vary depending upon-other variables in the reaction process. However, the reaction interval at the elevated temperature is generally between about 10 minutes and 24 hours, with an interval between about 6 hours and about 8 hours being preferred. The preferred time will depend on the choice of metal for production of metal phosphate as well as choice of temperature of reaction and choice of reaction precursors.

Once the reaction interval is complete, the material is permitted to cool to ambient temperature. The rate of cooling can be from a few degrees per minute to about 100° C./minute, with a preferred cooling rate between about 20° C./minute and about 60° C./minute. Desirably, the cooling occurs at a rate of about 50° C./minute. Such cooling has been found to be adequate to achieve the desired structure of the final product. It is also possible to quench the products at a cooling rate on the order of about 100° C./minute. In some instances, such rapid cooling may be preferred. If desired or required, the pelletized material can be re-ground and reformed into pellets. The reaction process can be repeated in this fashion for sufficient iterations to ensure proper and complete reaction.

Exemplary compounds produced by this method include lithium iron phosphate, lithium vanadate, and lithium vanadium phosphate. A variety of starting materials are available for production of lithium iron phosphate, and include materials such as lithium carbonate, lithium dihydrogenphosphate, iron phosphate, and iron oxide.

Incorporation of Active Materials Into Cells:

The materials produced with the present invention were subsequently tested. FIGS. 1–6 which will be described more particularly below show the characterization data and electrochemical performance in actual use for the cathode materials (positive electrodes) of the invention. Some tests were conducted in a cell comprising a lithium metal counter electrode (negative electrode). All of the cells had an electrolyte with EC/DMC as solvent in a 2:1 weight ratio with 1 mole $LiPF_6$ salt.

Typical cell configurations will now be described with reference to FIGS. 7 and 8; and such battery or cell utilizes the novel active material of the invention. Note that the preferred cell arrangement described here is illustrative and is not limited thereby. Experiments are often performed, based on full and half cell arrangements, as per the following description. For test purposes, test cells are often fabricated using lithium metal electrodes. When forming cells for use as batteries, it is preferred to use an insertion positive electrode and a graphitic carbon negative electrode.

Figure 7:
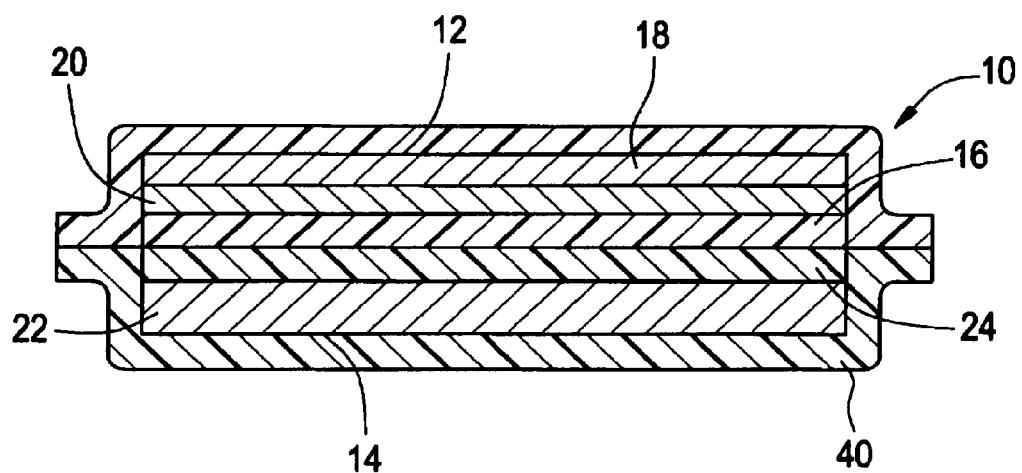
FIG. 7 is a diagrammatic representation of a typical laminated lithium-ion battery cell structure.

A typical laminated battery cell structure 10 is depicted in FIG. 7. It comprises a negative electrode side 12, a positive electrode side 14, and an electrolyte/separator 16 therebetween. Negative electrode side 12 includes current collector 18, and positive electrode side 14 includes current collector 22. A copper collector foil 18, preferably in the form of an open mesh grid, upon which is laid a negative electrode membrane 20 comprising an insertion material, such as carbon or graphite or low-voltage lithium insertion compound, dispersed in a polymeric binder matrix. The electrolyte/separator film 16 membrane is preferably a plasticized copolymer. This electrolyte/separator preferably comprises a polymeric separator and a suitable electrolyte for ion transport. The electrolyte/separator is positioned upon the electrode element and is covered with a positive electrode membrane 24 comprising a composition of a finely divided lithium insertion compound in a polymeric binder matrix. An aluminum collector foil or grid 22 completes the assembly. Protective bagging material 40 covers the cell and prevents infiltration of air and moisture.

Figure 8:
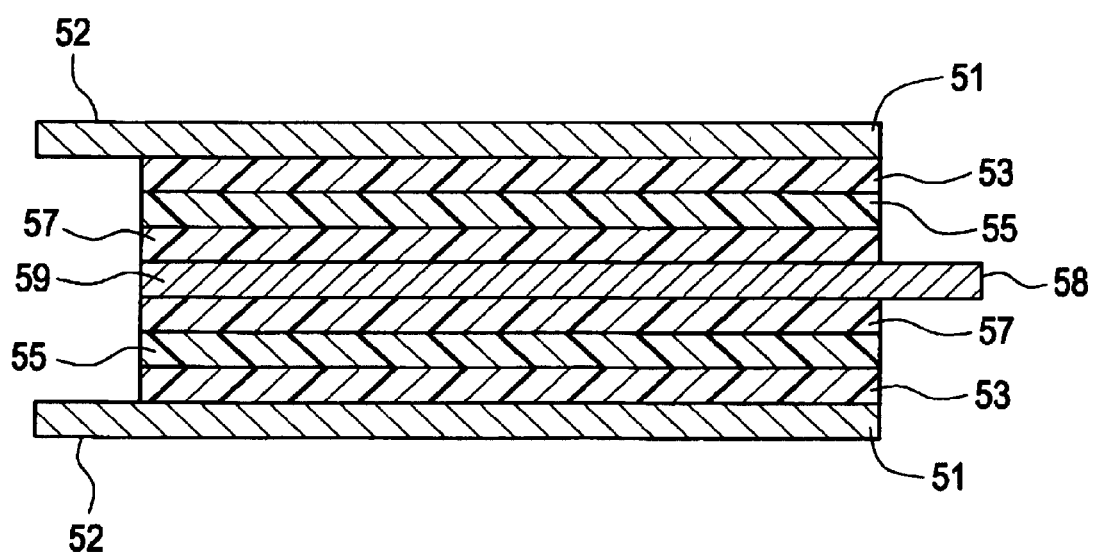
FIG. 8 is a diagrammatic representation of a typical multi-cell battery cell structure.

In another embodiment, a multi-cell battery configuration as per FIG. 8 is prepared with copper current collector 51, negative electrode 53, electrolyte/separator 55, positive electrode 57, and aluminum current collector 59. Tabs 52 and 58 of the current collector elements form respective terminals for the battery structure. As used herein, the terms "cell" and "battery" refer to an individual cell comprising anode/electrolyte/cathode and also refer to a multi-cell arrangement in a stack.

The relative weight proportions of the components of the positive electrode are generally: 50–90% by weight active material; 5–30% carbon black as the electric conductive diluent; and 3–20% binder chosen to hold all particulate materials in contact with one another without degrading ionic conductivity. Stated ranges are not critical, and the amount of active material in an electrode may range from 25–95 weight percent. The negative electrode comprises about 50–95% by weight of a preferred graphite, with the balance constituted by the binder. A typical electrolyte separator film comprises approximately two parts polymer for every one part of a preferred fumed silica. The conductive solvent comprises any number of suitable solvents and salts. Desirable solvents and salts are described in U.S. Pat. Nos. 5,643,695 and 5,418,091. One example is a mixture of $EC:DMC:LiPF_6$ in a weight ratio of about 60:30:10.

Solvents are selected to be used individually or in mixtures, and include dimethyl carbonate (DMC), diethyl-carbonate (DEC), dipropylcarbonate (DPC), ethylmethyl-carbonate (EMC), ethylene carbonate (EC), propylene carbonate (PC), butylene carbonate, lactones, esters, glymes, sulfoxides, sulfolanes, etc. The preferred solvents are EC/DMC, EC/DEC, EC/DPC and EC/EMC. The salt content ranges from 5% to 65% by weight, preferably from 8% to 35% by weight.

Those skilled in the art will understand that any number of methods are used to form films from the casting solution using conventional meter bar or doctor blade apparatus. It is usually sufficient to air-dry the films at moderate temperature to yield self-supporting films of copolymer composition. Lamination of assembled cell structures is accomplished by conventional means by pressing between metal plates at a temperature of about 120–160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

Separator membrane element 16 is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are particularly suitable. Inorganic filler adjuncts, such as fumed alumina or silanized fumed silica, may be used to enhance the physical strength and melt viscosity of a separator membrane and, in some compositions, to increase the subsequent level of electrolyte solution absorption.

In the construction of a lithium-ion battery, a current collector layer of aluminum foil or grid is overlaid with a positive electrode film, or membrane, separately prepared as a coated layer of a dispersion of insertion electrode composition. This is typically an insertion compound such as $LiMn_2O_4$ (LMO), $LiCoO_2$, or $LiNiO_2$, powder in a copolymer matrix solution, which is dried to form the positive electrode. Other insertion compounds include lithium metal fluorophosphate, lithium metal phosphates and lithium metal oxides produced by this method. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film negative electrode film, and electrolyte/separator membrane. The assembled components are then heated under pressure to achieve heat fusion bonding between the plasticized copolymer matrix electrode and electrolyte components, and to the collector grids, to thereby form an effective laminate of cell elements. This produces an essentially unitary and flexible battery cell structure.

Examples of forming cells containing metallic lithium anode, insertion electrodes, solid electrolytes and liquid electrolytes can be found in U.S. Pat. Nos. 4,668,595; 4,830,939; 4,935,317; 4,990,413; 4,792,504; 5,037,712; 5,262,253; 5,300,373; 5,435,054; 5,463,179; 5,399,447; 5,482,795 and 5,411,820; each of which is incorporated herein by reference in its entirety. Note that the older generation of cells contained organic polymeric and inorganic electrolyte matrix materials, with the polymeric being most preferred. The polyethylene oxide of U.S. Pat. No. 5,411,820 is an example. More modern examples are the VdF:HFP polymeric matrix. Examples of casting, lamination and formation of cells using VdF:HFP are as described in U.S. Pat. Nos. 5,418,091; 5,460,904; 5,456,000; and 5,540,741; assigned to Bell Communications Research, each of which is incorporated herein by reference in its entirety.

As described earlier, the electrochemical cell operated as per the invention, may be prepared in a variety of ways. In one embodiment, the negative electrode may be metallic lithium. In more desirable embodiments, the negative electrode is an insertion active material, such as, metal oxides and graphite. When a metal oxide active material is used, the components of the electrode are the metal oxide, electrically conductive carbon, and binder, in proportions similar to that described above for the positive electrode. In a preferred embodiment, the negative electrode active material is graphite particles. For test purposes, test cells are often fabricated using lithium metal electrodes. When forming cells for use as batteries, it is preferred to use an insertion metal oxide positive electrode and a graphitic carbon negative electrode. Various methods for fabricating electrochemical cells and batteries and for forming electrode components are described herein. The invention is not, however, limited by any particular fabrication method.

The general aspects of the above synthesis routes are applicable to a variety of starting materials. Exemplary metal compounds include $Fe_2O_3$, $Fe_3O_4$, $V_2O_5$, $VO_2$, $LiVO_3$, $NH_4VO_3$, $Mg(OH)_2$, $CaO$, $MgO$, $Ca(OH)_2$, $MnO_2$, $Mn_2O_3$, $Mn_3(PO_4)_2$, $CuO$, $SnO$, $SnO_2$, $TiO_2$, $Ti_2O_3$, $Cr_2O_3$, $PbO_2$, $PbO$, $Ba(OH)_2$, $BaO$, $Cd(OH)_2$, $FePO_4$, $Fe_3(PO_4)_2$, $Zn_3(PO_4)_2$, $Mg_3(PO_4)_2$ and mixtures thereof. The metal compounds are reduced in the presence of a reducing agent, such as hydrogen or carbon. The same considerations apply to other metal and phosphate containing starting materials. The thermodynamic considerations such as ease of reduction, of the selected starting materials, the reaction kinetics, and the melting point of the salts will cause adjustment in the general procedure, such as the amount of reducing agent, the temperature of the reaction, and the dwell time.

Formation of Active Materials

EXAMPLE I

Reaction 1(a)—Using Hydrogen to Form Precursors

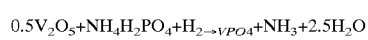

$$0.5V_2O_5 + NH_4H_2PO_4 + H_2 \rightarrow_{VPO4} + NH_3 + 2.5H_2O$$

(a) Pre-mix reactants in following proportions using ball mill. Thus,
  0.5 mol $V_2O_5$=90.94 g
  1.0 mol $NH_4H_2PO_4$=115.03 g
(b) Pelletize the power mixture.
(c) Heat to 300° C. at a rate of 2° C./minute in a flowing $H_2$ atmosphere. Dwell for 8 hours at 300° C.

(d) Cool at 2° C./minute to room temperature.

(e) Powderize and re-pelletize.

(f) Heat to 850° C. in a flowing $H_2$ atmosphere at a rate of 2° C./minute. Dwell for 8 hours at 850° C.

(g) Cool at 2° C./minute to room temperature.

Reaction 1(b)—Formation of Lithium Vanadium Fluorophosphate

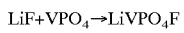

$$LiF + VPO_4 \rightarrow LiVPO_4F$$

(a) Pre-mix reactants in equi-molar portions using a ball mill. Thus,
1 mol LiF=25.94 g
1 mol $VPO_4$=145.91 g (b) Pelletize powder mixture.

(c) Heat to 700° C. at a rate of 2° C./minute in an air atmosphere in a covered nickel crucible. Dwell for 15 minutes at 700° C.

(d) Cool to room temperature at about 50° C./minute.

(e) Powderize pellet.

EXAMPLE II

Reaction 2(a)—Using a Carbothermal Method to Form Precursors.

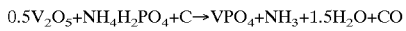

$$0.5V_2O_5 + NH_4H_2PO_4 + C \rightarrow VPO_4 + NH_3 + 1.5H_2O + CO$$

(a) Pre-mix reactants in the following proportions using ball mill. Thus,
0.5 mol $V_2O_5$=90.94 g
1.0 mol $NH_4H_2PO_4$=115.03 g
1.0 mol carbon=12.0 g
(Use 10% excess carbon→13.2 g)

(b) Pelletize powder mixture.

(c) Heat pellet to 300° C. at a rate of 2° C./minute in an inert atmosphere (e.g., argon). Dwell for 3 hours at 3000° C.

(d) Cool to room temperature at 2° C./minute.

(e) Powderize and re-pelletize.

(f) Heat pellet to 850° C. at a rate of 2° C./minute in an inert atmosphere (e.g. argon). Dwell for 8 hours at 850° C. under an argon atmosphere.

(g) Cool to room temperature at 2° C./minute.

(h) Powderize pellet.

Reaction 2(b)—Formation of Lithium Vanadium Fluorophosphate

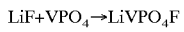

$$LiF + VPO_4 \rightarrow LiVPO_4F$$

(a) Pre-mix reactants in equi-molar portions using a ball mill. Thus,
1 mol LiF=25.94 g
1 mol $VPO_4$=145.91 g (b) Pelletize powder mixture.

(c) Heat to 700° C. at a rate of 2° C./minute in an air atmosphere in a nickel crucible. Dwell for 15 minutes at 700° C.

(d) Cool to room temperature at about 50° C./minute.

(e) Powderize pellet.

EXAMPLE III

Reaction 3(a)—Formation of Aluminum Phosphate.

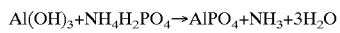

$$Al(OH)_3 + NH_4H_2PO_4 \rightarrow AlPO_4 + NH_3 + 3H_2O$$

(a) Premix reactants in equi-molar portions using a ball mill. Thus,
1.0 mol $Al(OH)_3$=78.0 g
1.0 mol $NH_4H_2PO_4$=115.03 g (b) Pelletize powder mixture.

(c) Heat to 950° C. at a rate of 2° C./minute in an air atmosphere. Dwell for 8 hours at 950° C.

(d) Cool to room temperature at about 50° C./minute.

(e) Powderize.

Reaction 3(b)—Formation of Lithium Vanadium Aluminum Fluorophosphate

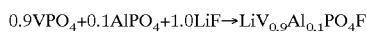

$$0.9VPO_4 + 0.1AlPO_4 + 1.0LiF \rightarrow LiV_{0.9}Al_{0.1}PO_4F$$

(a) Pre-mix reactants in the following proportions using ball mill. Thus,
0.9 mol $VPO_4$=131.3 g
0.1 mol $AlO_4$=12.2 g
1.0 mol LiF=25.9 g (b) Pelletize powder mixture.

(c) Heat to 700° C. at a rate of 2° C./minute in a nickel crucible in either an air or inert atmosphere. Dwell for 15 minutes at 700° C.

(d) Cool to room temperature at about 50° C./minute.

(e) Powderize.

EXAMPLE IV

Reaction 4—Production of Lithium Vanadium Fluorophosphate in an Alternate Formulation.

$$0.5Li_2CO_3 + NH_4F + VPO_4 \rightarrow LiVPO_4F + 0.5H_2O + NH_3 + 0.5CO_2$$

(a) Pre-mix reactants in the following proportions using a ball mill. Thus,
0.5 mol $Li_2CO_3$=37.0 g
1.0 mol $NH_4F$=37.0 g
1.0 mol $VPO_4$=145.9 g (b) Pelletize powder mixture.

(c) Heat to 700° C. at a rate of 2° C./minutes in an air atmosphere. Dwell for 15 minutes at 700° C.

(d) Cool to room temperature.

(e) Powderize pellet.

EXAMPLE V

Reaction 5—Single Step Preparation of Lithium Vanadium Fluorophosphate Using Lithium Fluoride in a Carbothermal Method.

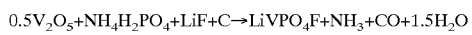

$$0.5V_2O_5 + NH_4H_2PO_4 + LiF + C \rightarrow LiVPO_4F + NH_3 + CO + 1.5H_2O$$

(a) Pre-mix reactants in the following proportions using a ball mill. Thus,
0.5 mol $V_2O_5$=90.94 g
1.0 mol $NH_4H_2PO_4$=115.03 g
1.0 mol LiF=25.94 g
1.0 mol carbon=12.0 g
(Use 10% excess carbon→13.2 g)

(b) Pelletize powder mixture., (c) Heat pellet to 300° C. at a rate of 2° C./minute in an inert atmosphere. Dwell for 3 hours at 300° C.

(d) Cool to room temperature at 2° C./minute.
(e) Powderize and repelletize.
(f) Heat pellet to 750° C. at a rate of 2° C./minute in an inert atmosphere (e.g. argon). Dwell for 1 hour at 750° C. under an argon atmosphere.
(g) Cool to room temperature at 2° C./minute.
(h) Powderize pellet.

EXAMPLE VI
Reaction 6a—Formation of Iron Phosphate.

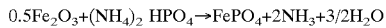

(a) Pre-mix reactants in the following proportions using a ball mill. Thus,
0.5 mol $Fe_2O_3$=79.8 g
1.0 mol $(NH_4)_2HPO_4$=132.1 g
(b) Pelletize powder mixture.
(c) Heat to 300° C. at 2° C./minute in air atmosphere. Dwell 8 hours and cool to room temperature.
(d) Re-pelletize.
(e) Heat to 900° C. at 2° C./minute in air atmosphere. Dwell 8 hours and cool to room temperature.
(f) Powderize.

Reaction 6b—Formation of $LiFePO_4F$

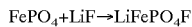

(a) Pre-mix reactants in the following proportions using a ball mill. Thus,
1 mol $FePO_4$=150.8 g
1 mol LiF=25.9 g
(b) Pelletize.
(c) Heat to 700° C. at 2° C./minute in air atmosphere.
(d) 15 minute dwell.
(e) Cool to room temperature.
(f) Powderize.

EXAMPLE VII
Reaction 7a—Formation of Titanium Phosphate.

(a) Pre-mix reactants in the following proportions using a ball mill. Thus,
1.0 mol. $TiO_2$=79.9 g
1.0 mol $NH_4H_2PO_4$=115.0 g
(b) Pelletize powder mixture.
(c) Heat to 300° C. at 2° C./minute in air atmosphere. Dwell for 3 hours.
(d) Cool to room temperature.
(e) Re-pelletize.
(f) Heat to 850° C. at 2° C./minute in $H_2$ atmosphere. Dwell for 8-hours.
(g) Cool to room temperature.
(h) Powderize.

Reaction 7b—Formation of $LiTiPO_4F$.

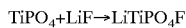

(a) Pre-mix reactants in the following proportions using a ball mill. Thus,
1 mol $TIPO_4$=142.9 g
1 mol LiF=25.9 g
(b) Pelletize powder mixture.
(c) Heat to 700° C. at 2° C./minute in inert atmosphere.
(d) 15 minute dwell.
(e) Cool to room temperature.
(f) Powderize.

EXAMPLE VIII
Reaction 8a—Formation of Chromium Phosphate.

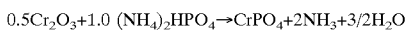

(a) Pre-mix reactants in the following proportions using a ball mill. Thus,
0.5 mol $Cr_2O_3$=76.0 g
1.0 mol $(NH_4)_2HPO_4$=132.1 g
(b) Pelletize powder mixture.
(c) Heat to 500° C. at 2° C./minute in air atmosphere. Dwell 6 hours and cool to room temperature.
(d) Re-pelletize.
(e) Heat to 1050° C. at 2° C./minute in air atmosphere. Dwell 6 hours and cool to room temperature.
(f) Powderize.

Reaction 8b—Formation of $LiCrPO_4F$

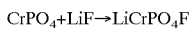

(a) Pre-mix reactants in the following proportions using a ball mill. Thus,
1 mol $CrPO_4$=147.0 g
1 mol LiF=25.9 g
(b) Pelletize powder mixture.
(c) Heat to 700° C. at 2° C./minute in air atmosphere.
(d) 15 minute dwell.
(e) Cool to room temperature.
(f) Powderize.

EXAMPLE IX
Reaction 9a—Formation of Titanium Phosphate Using Carbothermal Method.

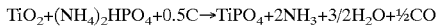

(a) Pre-mix reactants in the following proportions using a ball mill. Thus,
1.0 mol $TiO_2$=79.9 g.
1.0 mol $(NH_4)_2H_1PO_4$=132.06.0 g 0.5 mol C=6.0 g
(b) Pelletize powder mixture.
(c) Heat to 300° C. at 2° C./minute in air or inert atmosphere. Dwell for 3 hours.
(d) Cool to-room temperature.
(e) Re-pelletize.
(f) Heat to 850° C. at 2° C./minute in air or inert atmosphere. Dwell for 8 hours.
(g) Cool to room temperature.
(h) Powderize.

Reaction 9b—Formation of $LiTiPO_4F$.

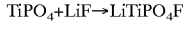

(a) Pre-mix reactants in the following proportions using a ball mill. Thus,
1 mol $TIPO_4$=142.9 g
1 mol LiF=25.9 g
(b) Pelletize powder-mixture.

(c) Heat to 700° C. at 2° C./minute in inert atmosphere.
(d) 15 minute dwell.
(e) Cool to room temperature.
(f) Powderize.

EXAMPLE X
Reaction 10—Thermite Reduction of Lithium and Iron Precursors for Producing a Cathode Active Material.

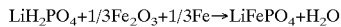
$$LiH_2PO_4 + 1/3Fe_2O_3 + 1/3Fe \rightarrow LiFePO_4 + H_2O$$

(a) Pre-mix reactants in the following proportions using a ball mill. Thus,
 1 mol $LiH_2PO_4$=103.9 g
 1/3 mol $Fe_2O_3$=53.2 g
 1/3 mol Fe powder=18.6 g
 (use up to 50% excess Fe→27.9 g)
(b) Pelletize.
(c) Heat to 750° C. at a rate of 2° C./minute in a non-oxidizing atmosphere. Dwell for 8 hours at 750° C.
(d) Cool to room temperature.
(e) Powderize.

EXAMPLE XI
Reaction 11—Thermite Reduction of Lithium and Iron Compounds for the Production of Lithium Iron Phosphate as a Cathode Material.

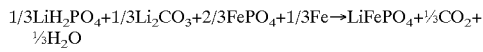
$$1/3LiH_2PO_4 + 1/3Li_2CO_3 + 2/3FePO_4 + 1/3Fe \rightarrow LiFePO_4 + 1/3CO_2 + 1/3H_2O$$

(a) Pre-mix reactants in the following proportions using a ball mill. Thus,
 0.333 mol $LiH_2PO_4$=34.6 g
 0.333 mol $Li_2CO_3$=24.6 g
 0.667 mol $FePO_4$=100.6 g
 0.333 mol Fe powder=18.6 g
 (May use up to 50% excess Fe=27.9 g)
(b) Pelletize.
(c) Heat to 750° C. at a rate of 2° C./minute in a non-oxidizing atmosphere (e.g., argon). Dwell for 8 hours at 750° C.
(d) Cool to room temperature.
(e) Powderize.

EXAMPLE XII
Reaction 12—Preparation of Lithium Iron Phosphate Using Iron Phosphate and Aluminum.

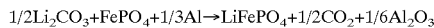
$$1/2Li_2CO_3 + FePO_4 + 1/3Al \rightarrow LiFePO_4 + 1/2CO_2 + 1/6Al_2O_3$$

(a) Pre-mix reactants in the following proportions using a ball mill. Thus,
 0.5 mol $Li_2CO_3$=37.0 g
 1.0 mol $FePO_4$=150.8 g
 0.333 mol Al=9.0 g
 (May use up to 50% excess Al=13.5 g)
(b) Pelletize.
(c) Heat to 750° C. at a rate of 2° C./minute in a non-oxidizing atmosphere (e.g., argon). Dwell for 8 hours at 750° C.
(d) Cool to room temperature.
(e) Powderize.

EXAMPLE XIII
Reaction 13—Preparation of Lithium Magnesium Iron Phosphate Using Aluminum.

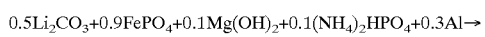
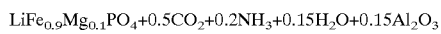
$$0.5Li_2CO_3 + 0.9FePO_4 + 0.1Mg(OH)_2 + 0.1(NH_4)_2HPO_4 + 0.3Al \rightarrow$$
$$LiFe_{0.9}Mg_{0.1}PO_4 + 0.5CO_2 + 0.2NH_3 + 0.15H_2O + 0.15Al_2O_3$$

(a) Pre-mix reactants in the following proportions using a ball mill. Thus,
 0.5 mol $Li_2CO_3$=37.0 g
 0.9 mol $FePO_4$=135.7 g
 0.1 mol $(NH_4)_2HPO_4$=13.2 g
 0.1 mol $Mg(OH)_2$=5.8 g
 0.3 mol Al=8.1 g
 (May use up to 50% excess Al=12.15 g)
(b) Pelletize.
(c) Heat to 750° C. at a rate of 2° C./minute in a non-oxidizing atmosphere (e.g., argon). Dwell for 8 hours at 750° C.
(d) Cool to room temperature.
(e) Powderize.

EXAMPLE XIV
Reaction 14—Preparation of Lithium Vanadium Oxide ($LiV_2O_5$) Using Vanadium, Oxide and Metallic Vanadium.

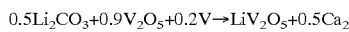
$$0.5Li_2CO_3 + 0.9V_2O_5 + 0.2V \rightarrow LiV_2O_5 + 0.5Ca_2$$

(a) Pre-mix reactants in the following proportions using a ball mill. Thus,
 0.5 mol $Li_2CO_3$=37.0 g
 0.9 mol $V_2O_5$=163.7 g
 0.2 mol V=10.2 g
 (May use up to 50% excess V=15.3 g)
(b) Pelletize.
(c) Heat to 750° C. at a rate of 2° C./minute in a non-oxidizing atmosphere (e.g., argon). Dwell for 8 hours at 750° C.
(d) Cool to room temperature.
(e) Powderize.

EXAMPLE XV
Reaction 15—Preparation of Lithium Vanadium Oxide ($LiV_2O_5$) Using Vanadium Oxide and Metallic Aluminum.

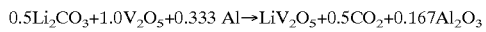
$$0.5Li_2CO_3 + 1.0V_2O_5 + 0.333\,Al \rightarrow LiV_2O_5 + 0.5CO_2 + 0.167Al_2O_3$$

(a) Pre-mix reactants in the following proportions using a ball mill. Thus,
 0.5 mol $Li_2CO_3$=37.0 g
 1.0 mol $V_2O_5$=181.9 g
 0.333 mol Al=9.0 g
 (May use up to 50% excess Al=13.5 g)
(b) Pelletize.
(c) Heat to 750° C. at a rate of 2° C./minute in a non-oxidizing atmosphere (e.g., argon). Dwell for 8 hours at 750° C.
(d) Cool to room temperature.
(e) Powderize.

EXAMPLE XVI
Reaction 16—Preparation of Lithium Vanadium Phosphate

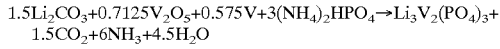

(a) Pre-mix reactants in the following proportions using a ball mill. Thus,
   1.5 mol $Li_2CO_3$=111.0 g
   0.7125 mol $V_2O_5$=129.6 g
   0.575 mol V=29.3 g
   3 mol $(NH_4)_2HPO_4$=396.3 g
   (May use up to 50% excess V=43.9 g).
(b) Pelletize.
(c) Heat to 300° C. at a rate of 2° C./minute in a non-oxidizing atmosphere (e.g., argon). Dwell for 8 hours at 300° C.
(d) Cool to room temperature.
(e) Powderize, and re-pelletize.
(f) Heat to 850° C. at a rate of 2° C./minute in a non-oxidizing atmosphere (e.g., argon). Dwell for 8 hours at 850° C.
(g) Cool to room temperature.
(h) Powderize.

EXAMPLE XVII
Reaction 17—Preparation of Lithium Iron Phosphate Using Silicon Dioxide.

(a) Pre-mix reactants in the following proportions using a ball mill. Thus,
   1.0 mol $LiH_2PO_4$=103.9 g
   0.5 mol $Fe_2O_3$=79.9 g
   0.5 mol SiO=22.0 g
   (May use up to 50% excess SiO=33.0 g)
(b) Pelletize.
(c) Heat to 750° C. at a rate of 2° C./minute in a non-oxidizing atmosphere (e.g., argon). Dwell for 8 hours at 750° C.
(d) Cool to room temperature.
(e) Powderize.

EXAMPLE XVIII
Reaction 18—Preparation of Lithium Magnesium Iron Phosphate Using Magnesium.

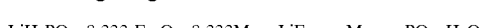

(a) Pre-mix reactants in the following proportions using a ball mill. Thus,
   1 mol $LiH_2PO_4$=103.9 g
   0.333 mol $Fe_2O_3$=53.2 g
   0.333 mol Mg=8.1 g
   (May use up to 50% excess Mg=12.1 g)
(b) Pelletize.
(c) Heat to 750° C. at a rate of 2° C./minute in a non-oxidizing atmosphere (e.g., argon). Dwell for 8 hours at 750° C.
(d) Cool to room temperature.
(e) Powderize.

Characterization of Active Materials and Formation and Testing of Cells

Referring to FIG. 1, the final product $LiVPO_4F$, prepared from $V_2O_5$ metal compound per Reaction 1, appeared black in color. From Example I, the $LiVPO_4F$ was formed using a two stage process. The first stage involved creating a metal phosphate precursor, vanadium phosphate. The vanadium phosphate was created following the basic procedure, with vanadium pentoxide and ADHP mixed in about a 1:2 molar ratio in a ball mill, and ground for about 30 minutes. The mixture was formed into a pellet, and heated at about 2° C./minute to a temperature of about 300° C. The pellet was maintained at that temperature for about 8 hours before cooling to ambient. The pellet was re-ground and re-pelletized before reheating at about 2° C./minute to a greater temperature of about 850° C., and maintained at that temperature for about 8 hours. The reactions were carried out under a flowing hydrogen atmosphere. Upon completion of the first stage, the second stage involved mixing and grinding the vanadium phosphate formed in stage one with lithium fluoride. The mixture was pressed into a pellet, and the pellet was heated at about 2° C./minute to a temperature of about 700° C. The pellet was held at this temperature for about 15 minutes, and then cooled to ambient, and ground into a powder. The resulting product was a material with a triclinic crystal structure. The triclinic unit cell crystal structure is characterized by a lack of symmetry. In a triclinic crystal structure, a≠b≠c, and α≠β≠γ≠90°. This product's CuKα x-ray diffraction (XRD) pattern contained all of the peaks expected for this material as shown in FIG. 1. The pattern evident in FIG. 1 is consistent with the single phase triclinic phosphate $LiVPO_4F$. This is evidenced by the position of the peaks in terms of the scattering angle 2 θ (theta), x axis. Here the space group and the lattice parameters from XRD refinement are consistent with the triclinic structure. The values are a=5.1738 Å (0.002), b=5.3096 Å (0.002), c=7.2503 Å (0.001); the angle α=72.4794 (0.06), β=107.7677 (0.04), γ=81.3757 (0.04), cell volume=174.53 Å$^3$.

The x-ray pattern demonstrates that the product of the invention was indeed the nominal formula. $LiVPO_4F$. The term "nominal formula" refers to the fact that the relative proportion of atomic species may vary slightly on the order of up to 5 percent, or more typically, 1 percent to 3 percent. In another aspect, any portion of P (phosphorous) may be substituted by Si (silicon), S (sulfur) and/or As (arsenic).

Figure 2:
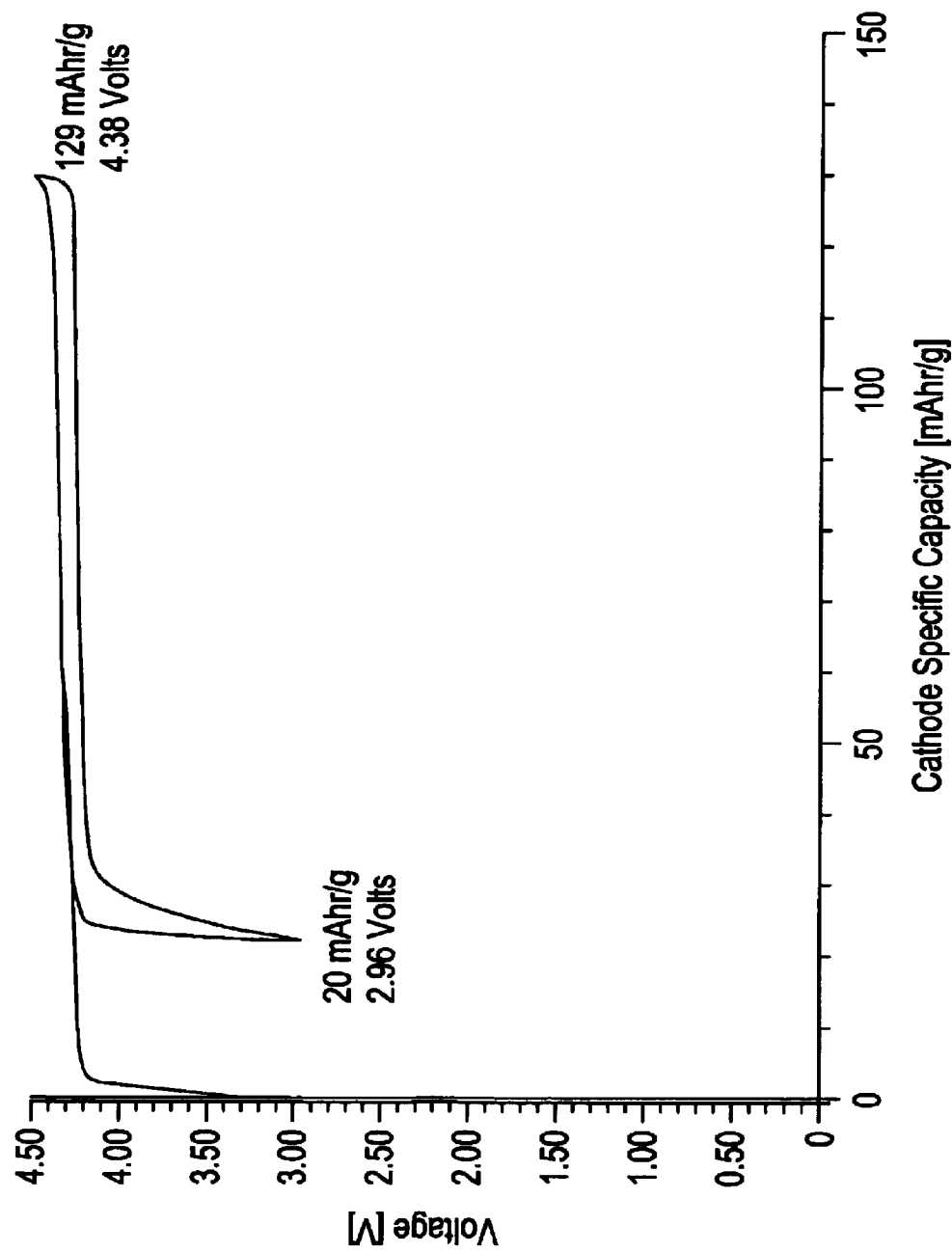
FIG. 2 is a voltage/capacity plot of $LiVPO_4F$ containing cathode cycled with a lithium metal anode in a range of 3.0 to 4.4 volts. The cathode contained 29.4 mg of $LiVPO_4F$ active material prepared by the method described above.

The $LiVPO_4F$, prepared as described immediately above, was tested in an electrochemical cell. The positive electrode was prepared as described above, using 22.5 mg of active material. The positive electrode contained, on a weight %, basis, 80% active material, 8% carbon black, and 12% Kynar. Kynar is commercially available PVdF:HFP copolymers used as binder material. The negative electrode was metallic lithium. The electrolyte was 2:1 weight ratio mixture of EC and DMC within which was dissolved 1 molar $LiPF_6$. The cells were cycled between 3.5 and 4.4 with performance as shown in FIG. 2. FIG. 2 is an Electrochemical Voltage Spectroscopy (EVS) voltage/capacity profile for a cell with cathode material formed with $LiVPO_4F$. FIG. 2 shows the results of the first cycle with the critical limiting current density less than 0.1 milliamps per square centimeter with ±10 mV steps between about 3.0 and 4.4 volts based upon 29.4 milligrams of the $LiVPO_4F$ active material in the cathode (positive electrode). In an as prepared, as assembled, initial condition, the positive electrode active material is $LiVPO_4F$. The lithium is extracted from the $LiVPO_4F$ during charging of the cell. When fully charged, about 0.75 unit of lithium had been removed per formula unit. Consequently, the positive electrode active material corresponds to $Li_{1-x}VPO_4F$ where x appears to be equal to about 0.75, when the cathode material is at 4.4 volts versus Li/Li$^+$. The extraction represents approximately 129 milliamp hours per gram corresponding to about 3.8 milliamp hours based on 29.4 milligrams active material. Next, the cell is discharged whereupon a quantity of lithium is re-inserted into the LiVPO$_4$F. The re-insertion corresponds to approximately 109 milliamp hours per gram proportional to the insertion of essentially all of the lithium. The bottom of the curve corresponds to approximately 3.0 volts.

Figure 3:
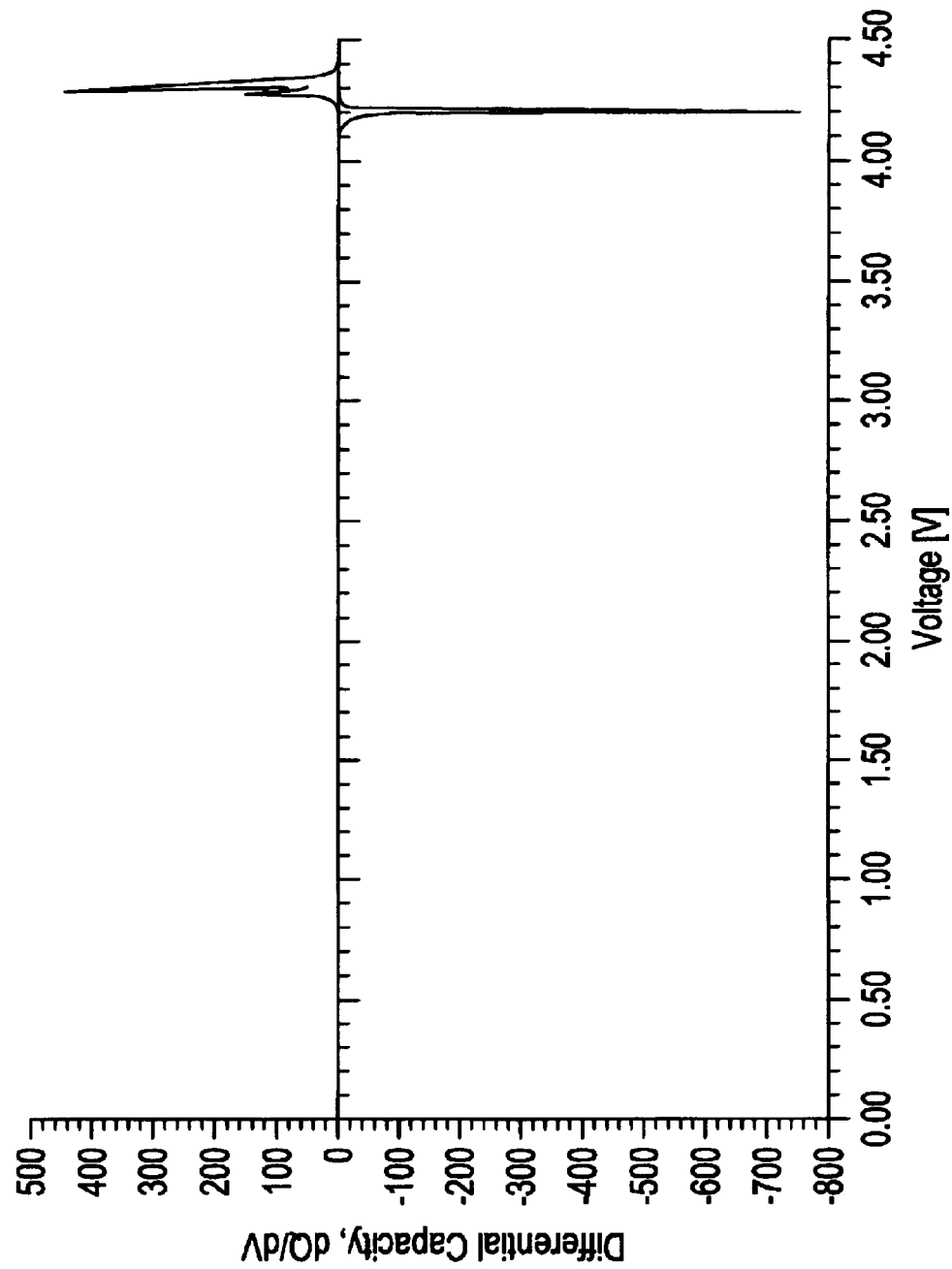
FIG. 3 is a graphic depiction of differential capacity during cell charge and discharge vs. cell voltage for the electrochemical cell containing $LiVPO_4F$.

FIG. 3 is an Electrochemical Voltage Spectroscopy differential capacity plot based on FIG. 2. As can be seen from FIG. 3, the relatively symmetrical nature of the peaks indicates good electrical reversibility. There are small peak separations (charge/discharge), and good correspondence between peaks above and below the zero axis. There are essentially no peaks that can be related to irreversible reactions, since peaks above the axis (cell charge) have corresponding peaks below the axis (cell discharge), and there is very little separation between the peaks above and below the axis. This shows that the LiVPO$_4$F as high quality electrode material.

Lithium vanadium fluorophosphate was also produced using a one stage process from Example V. A mixture was made of vanadium pentoxide, ammonium dihydrogen phosphate, lithium fluoride and carbon. The compounds were mixed with ratio of about 0.5:1:1:1 on a molar basis. The mixture was dry ground for about 30 minutes to intimately mix the powders in a ball mill. The powders were pressed into pellets. The reaction was conducted by heating the pellets in an oven at a preferred rate of about 2° C./minute to a first elevated temperature of about 300° C. The reaction was carried out at 300° C. for about 8 hours. The pellets were allowed to cool, then re-ground and repressed into-pellets. The reaction was continued by reheating the pellets in an oven at a preferred heating rate of about 2° C./minute to about 750° C., and held at 750° C. for about 8 hours to complete the reaction. The pellets were cooled to ambient and reground leaving the product LiVPO$_4$F.

Figure 4:
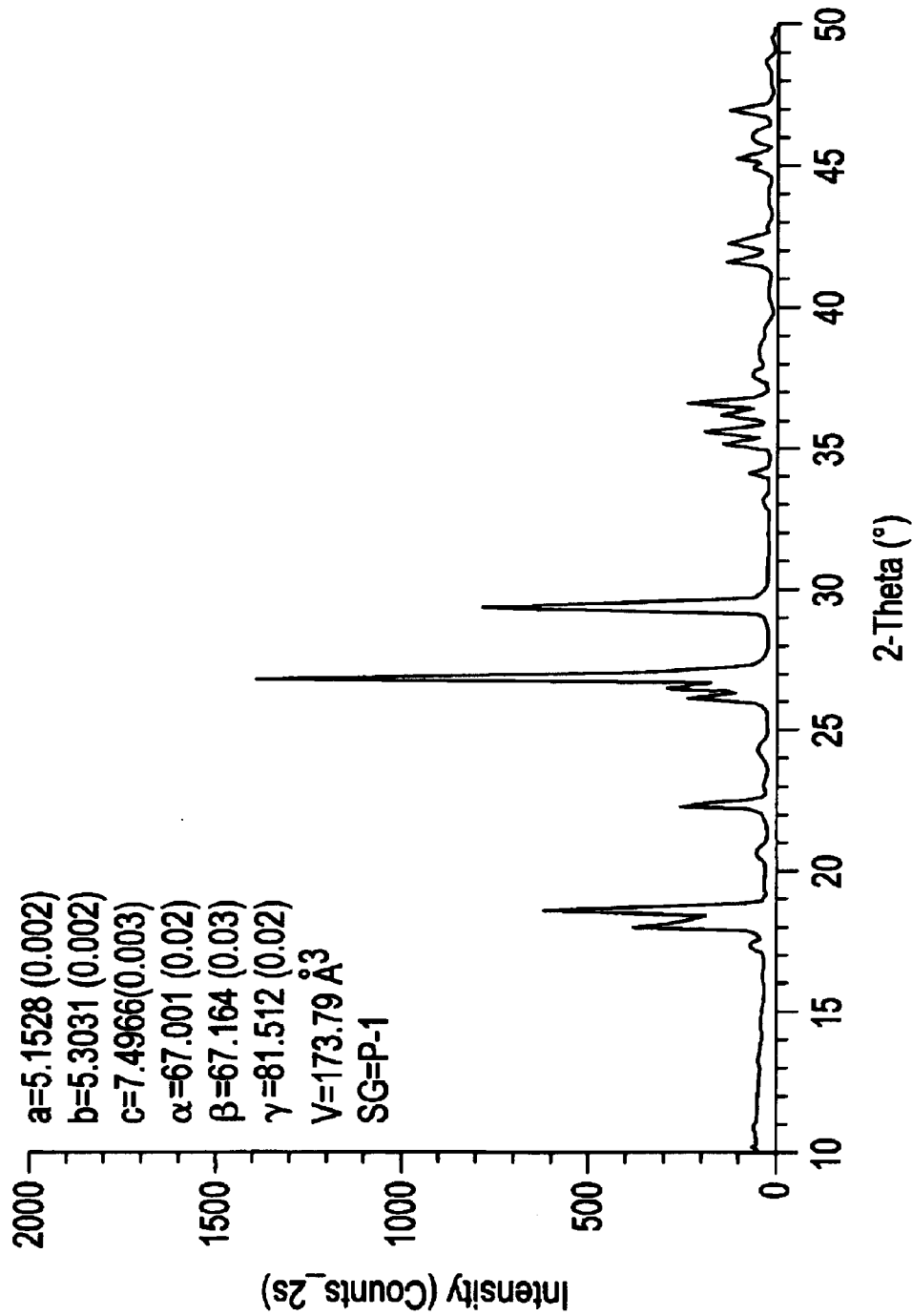
FIG. 4 shows the results of an x-ray diffraction analysis, of $LiFePO_4F$ prepared as above, using CuKα radiation, a=1.5404 Å. Bars refer to simulated pattern from refined cell parameters SG=P-1 (triclinic). The values are a=5.1528 Å (0.002), b=5.3031 Å (0.002), c=7.4966 Å (0.003); the angle a=67.001° (0.02), a=67.164° (0.03), a=81.512° (0.02), cell volume=173.79 Å$^3$. The crystal system is triclinic.

Referring to FIG. 4, the final product LiFePO$_4$F, prepared from Fe$_2$O$_3$ metal compound per Reaction 6, appeared brown in color. From Example VI, the LiFePO$_4$F was formed using a two stage process. The first stage involved creating a metal phosphate precursor, iron phosphate. The iron phosphate was created following the basic procedure, with iron oxide and DAHP mixed in about a 1:2 molar ratio in a ball mill, and ground for about 30 minutes. The mixture was formed into a pellet, and heated at about 2° C./minute to a temperature of about 300° C. The pellet was maintained at that temperature for about 8 hours before cooling to ambient. The pellet was re-ground and re-pelletized before reheating at about 2° C./minute to a second elevated temperature of about 900° C. and maintained at that temperature for about 8 hours. Upon completion of the first stage, the second stage involved mixing and grinding the iron phosphate formed in the first stage with lithium fluoride. The mixture was pressed into a pellet, and the pellet was heated at about 2° C./minute to a temperature of about 700° C. The pellet was held at this temperature for about 15 minutes, and then cooled to ambient, and ground into a powder. The resulting product was a material with a triclinic crystal structure. This product's CuK$\alpha$ x-ray diffraction pattern contained all of the peaks expected for this material as shown in FIG. 4. The pattern evident in FIG. 4 is consistent with the single phase triclinic phosphate LiFePO$_4$F. This is evidenced by the position of the peaks in terms of the scattering angle 2 $\theta$ (theta), x axis. Here the space group and the lattice parameters from XRD refinement are consistent with the triclinic structure. The values are a=5.1528 Å (0.002), b=5.3031 Å (0.002), c=7.4966 Å (0.003); the angle $\alpha$=67.001° (0.02), $\beta$=67.164° (0.03), $\gamma$=81.512° (0.02), cell volume=173.79 Å$^3$. The x-ray pattern demonstrates that the product of the invention-was indeed the nominal formula LiFePO$_4$F.

Figure 5:
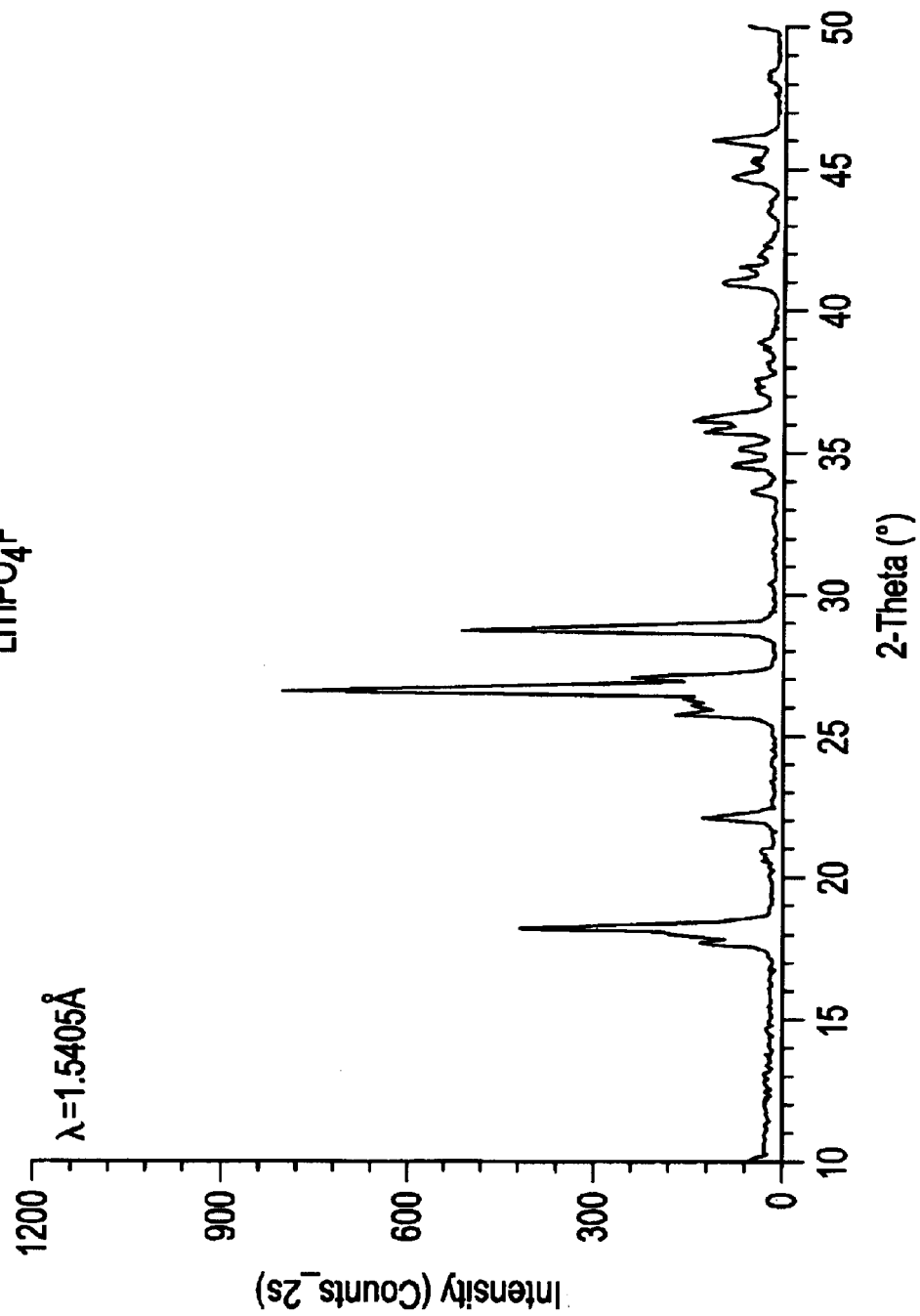
FIG. 5 shows the results of an x-ray diffraction analysis, of $LiTiPO_4F$ prepared as above, using CuKα radiation, a=1.5404 Å. The x-ray diffraction pattern was triclinic.

Referring to FIG. 5, the final product LiTiPO$_4$F, prepared from TiO$_2$ metal compound per Reaction 7, appeared green in color. From Example VII, the LiTiPO$_4$F was formed using a two stage process. The first stage involved creating a metal phosphate precursor, titanium phosphate. The titanium phosphate was created following the basic procedure, with titanium dioxide and ADHP mixed in about a 1:1 molar ratio in a ball mill, and ground for about 30 minutes. The mixture was formed into a pellet, and heated at about 2° C./minute to a temperature of about 300° C. The pellet was maintained at that temperature for about 3 hours-before cooling to ambient. The pellet was re-ground and re-pelletized before reheating at about 2° C./minute to a second elevated temperature of about 850° C., and maintained at that temperature for about 8 hours. The reactions were carried out under a flowing hydrogen atmosphere. Upon completion of the first stage, the second stage involved mixing and grinding the titanium phosphate formed in the first stage with lithium fluoride. The mixture was pressed into a pellet, and the pellet was heated at about 2° C./minute to a temperature of about 700° C. The pellet was held at this temperature for about 15 minutes, and then 'cooled' to ambient, and ground into a powder. The resulting product was a material with a triclinic crystal structure. This product's CuK$\alpha$ x-ray diffraction (XRD) pattern contained all of the peaks expected for this material as shown in FIG. 5. The pattern evident in FIG. 5 is consistent with the single phase triclinic phosphate LiTiPO$_4$F. This is evidenced by the position of the peaks in terms of the scattering angle 2 $\theta$ (theta), x axis. The x-ray diffraction pattern was triclinic.

In an alternative, LiTiPO$_4$F was prepared by the carbothermal method as in Reaction 9. The carbothermal method used carbon at the reducing agent, instead of hydrogen. The product using this method exhibited the same characteristics as the product prepared by Reaction 7.

Figure 6:
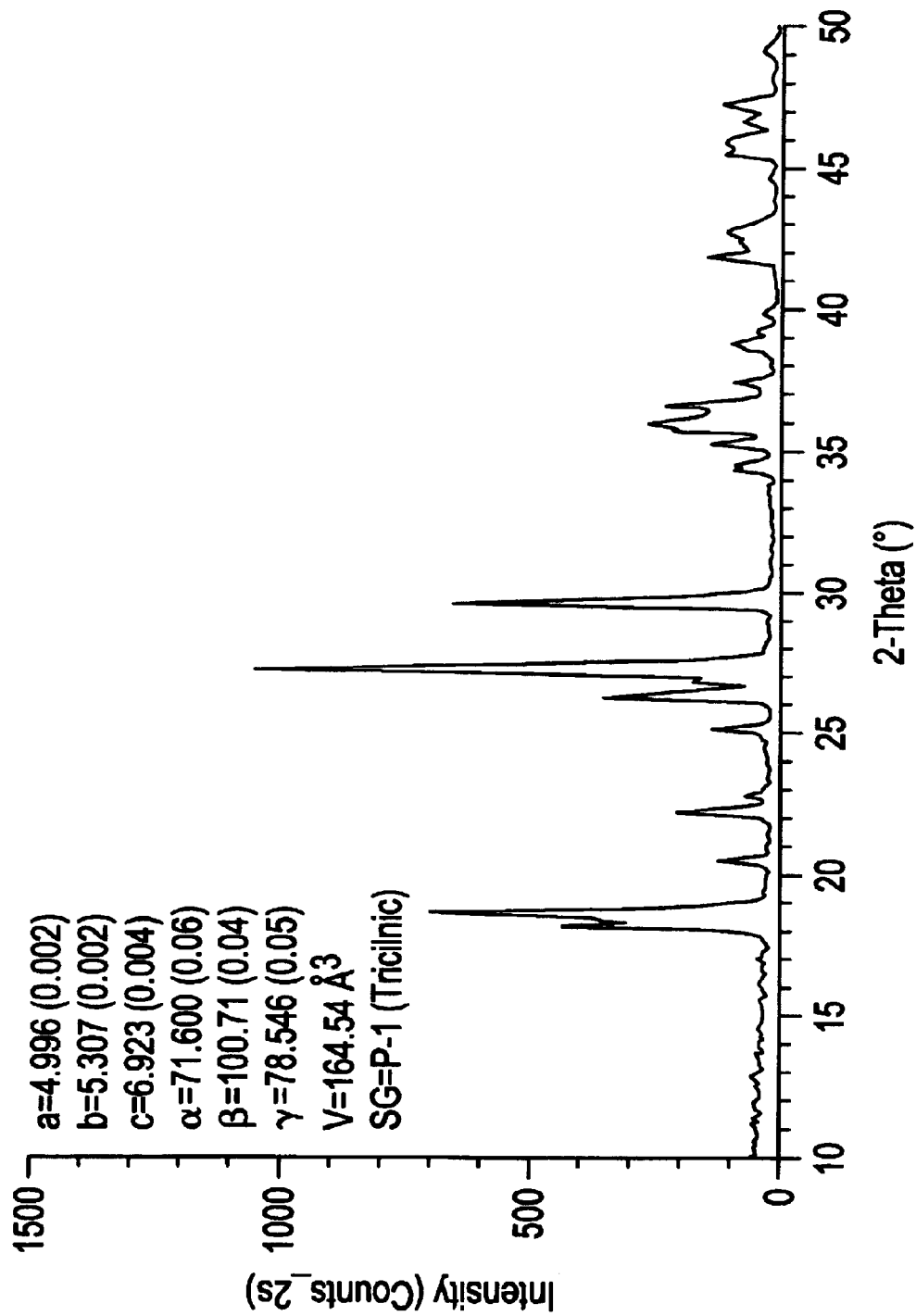
FIG. 6 shows the results of an x-ray diffraction analysis, of $LiCrPO_4F$ prepared as above, using CuKα radiation, a=1.5404 Å. Bars refer to simulated pattern from refined cell parameters SG=P-1 (triclinic). The values are a=4.996 Å (0.002), b=5.307 Å (0.002), c=6.923 Å (0.004); the angle a=71.600° (0.06), a=100.71° (0.04), a=78.546° (0.05), cell volume=164.54 Å$^3$. The crystal system is triclinic.

Referring to FIG. 6, the final product LiCrPO$_4$F, prepared from Cr$_2$O$_3$ metal compound per Reaction 8, appeared green in color. From Example VIII, the LiCrPO$_4$F was formed using a two stage process. The firsts stage involved creating a metal phosphate precursor, chromium phosphate. The chromium phosphate was created following the basic procedure, with chromium oxide and DAHP mixed in about a 1:2 molar ratio in a ball mill, and ground for about 30 minutes. The mixture was formed into a pellet, and heated at about 2° C./minute to a temperature of about 500° C. The pellet was maintained at that temperature for about 6 hours before cooling to ambient. The pellet was re-ground and re-pelletized before reheating at about 2° C./minute to a greater temperature of about 1050° C., and maintained at that temperature for about 6 hours. Upon completion of the first stage, the second stage involved mixing and grinding the chromium phosphate formed in stage one with lithium fluoride. The mixture was pressed into a pellet, and the pellet was heated at about 2° C./minute to a temperature of about 700° C. The pellet was held at this temperature for about 15 minutes, and then cooled to ambient, and ground into a powder. The resulting product was a material with a triclinic crystal structure. This product's CuK$\alpha$ x-ray diffraction pattern contained all of the peaks expected for this material as shown in FIG. 6. The pattern evident in FIG. 6 is consistent with the single phase triclinic phosphate LiCrPO$_4$F. This is evidenced by the position of the peaks in terms of the scattering angle 2 θ (theta), x-axis. Here the space group and the lattice parameters from XRD refinement are consistent with the triclinic structure. The values are a=4.996 Å (0.002), b=5.307 Å (0.002), c=6.923 Å (0.004); the angle α=71.600° (0.06), β=100.71° (0.04), γ=78.546° (0.05), cell volume=164.54 Å$^3$. The x-ray pattern demonstrates that the product of the invention was indeed the nominal formula LiCrPO$_4$F.

In addition, lithium metal phosphates and lithium metal oxides were produced by this invention. One such compound, lithium iron phosphate was fabricated, tested and characterized. Referring to FIG. 9, the final product LiFePO$_4$ was prepared from iron oxide as per Reaction 10. The starting materials are intimately mixed and dry ground for 30 minutes producing uniform finely ground powder. The starting materials are lithium dihydrogen phosphate, iron oxide, and the reducing agent elemental iron. The mixture is then pressed into pellet form. The reaction was conducted by heating at a preferred ramped heating rate of about 2° C./minute to an elevated temperature of about 750° C. and allowed to dwell for 8 hours. The reaction was carried out under a non-oxidizing atmosphere. The pellets were allowed-to cool to ambient temperature and then ground into'powder. This product's CuKα x-ray diffraction pattern contained all the peaks expected for this material as shown in FIG. 9. Here the space group and lattice parameters from XRD refinement are consistent with the olivine structure. The values are a=10.3123 Å (0.002), b=5.9979 Å (0.0037), c=6.923 Å (0.0012); and cell volume=289.7739 Å$^{o3}$. The x-ray pattern demonstrates that the-product of the invention was LiFePO$_4$. The LiFePO$_4$, prepared as described immediately above, was tested in an electrochemical cell. The positive electrode was prepared as described above using 10.7 mg of active material. The positive electrode contained, on a weight % basis, 80% active material, 8% carbon black, and 12% Kynar. The negative electrode was metallic lithium. The electrolyte was 2:1 weight ratio mixture of EC and DMC within which was dissolved 1 molar LiPF$_6$. The cells were cycled between 2.5 and 3.9 volts with-performances as shown in FIG. 10. FIG. 10 is a constant current cycling result using current density of ±0.2 mA/cm$^2$ between 2.5V and 4.0V for a cell with cathode material formed with LiFePO$_4$.

The product LiFePO$_4$ was prepared by several alternatives using different starting compounds and different reductants as evidenced by Reactions 11, 12, and 17. The products prepared by these reactions exhibited the same characteristics as the product prepared by Reaction 10.

As demonstrated by the above examples I–IX, the methods described herein have successfully been used to make the LiM$_{1-y}$MI$_y$PO$_4$F compounds. These methods produce products which are essentially homogeneous, single phase compounds having a triclinic crystal structure. Although small amounts of other materials or phases may be present, such does not alter the essential character of the products so produced. Examples X–XVIII demonstrate the invention is applicable for the production of other lithium metal compounds useable-as cathode active materials. Specifically, lithium metal phosphates and lithium metal oxides have been successfully produced using carbon and metals for reducing agents for the production of high purity cathode active materials.

In summary, the invention provides new methods for making new compounds LiM$_a$MI$_b$PO$_4$F, more specifically, LiM$_{1-y}$MI$_y$PO$_4$F, which are adaptable to commercial scale production. The new compounds are triclinic compounds as demonstrated by XRD analysis. The new materials demonstrate relatively high specific capacity coupled to a desirable voltage range and energetic reversibility and the methods provide efficient processes for making these new compounds. These properties make these materials excellent candidates as cathode active compound for lithium ion applications. The new-process produces materials conveniently and in high purity from available precursors. The precursors can be produced by methods, such as carbothermal reduction. In other words, this invention provides new methods of producing compounds capable of being commercially and economically produced for use in batteries. In addition, the invention provides methods of producing lithium metal phosphates and lithium metal oxides, as well as precursor materials such as transition metal phosphates. Transition metal phosphates are important precursor materials for the formation of cathode active materials. The metal phosphates are especially attractive when reacting with lithium fluoride as there is no weight loss in the generation of the lithium metal fluorophosphate cathode active materials. The carbothermal method is especially attractive, because any excess carbon that is not consumed is used as electrically conductive material in the cathode. The hydrogen reduction method for producing the metal phosphate precursors is also attractive, because the method produces compounds having a high purity.

While this invention has been described in terms of certain embodiments thereof, it is not intended that it be limited to the above description, but rather only to the extent set forth in the following claims.

The embodiments of the invention in which-an exclusive property or privilege is claimed are defined in the following claims.

What is claimed is:

1. A method of making lithium metal phosphate compound comprising the step of:
   reacting a particulate admixture of starting materials in a non-oxidizing atmosphere and at a temperature sufficient to form a lithium transition metal phosphate reaction product for use in making an electrode of a battery, wherein said particulate admixture of starting materials comprises at least one first metal constituent, at least one phosphate compound, at least one lithium compound, and at least one particulate reducing agent, wherein the lithium metal phosphate compound is not LiVPO$_4$F.

2. The method of claim 1 wherein the reaction is carried out at a temperature in a range between about 500° C. and about 1200° C.

3. The method of claim 1 wherein the at least one phosphate compound is selected from the group consisting of lithium dihydrogen phosphate, diammonium hydrogen phosphate, ammonium dihydrogen phosphate, transition metal phosphates, and mixtures thereof.

4. The method of claim 1 further comprising the step of:
   admixing the starting materials with at least one second metal constituent wherein the metal of the second metal constituent differs from the metal in the first metal constituent.

5. The method of claim 4 wherein the at least one second metal constituent is selected from the group consisting of:
   transition metals selected from the group consisting of Fe, Co, Ni, Mn, Cu, V. Ti, Cr, Zn, Cd, and mixtures thereof;
   oxides of transition metals selected from the group consisting of Fe, Co, Ni, Mn, Cu, V, Ti, Cr, Zn, Cd, and mixtures thereof;
   carbonates of transition metals selected from the group consisting of Fe, Co, Ni, Mn, Cu, V, Ti, Cr, Zn, Cd, and mixtures thereof;

phosphates of transition metals selected from the group consisting of Fe, Co. Ni, Mn, Cu, V, Ti, Cr, Zn, Cd, and mixtures thereof;

non-transition metals selected from the group consisting of Mg, Ca, Sr, Pb, Sn, Ba, Be, Al, B, and mixtures thereof;

hydroxides of non-transition metals selected from the group consisting of Mg, Ca, Sr, Pb, Sn, Ba, Be, and mixtures thereof;

oxides of non-transition metals selected from the group consisting of Mg, Ca, Sr, Pb, Sn, Ba, Be, and mixtures thereof; and mixtures thereof.

6. The method of claim 1 wherein the first metal constituent of the particulate starting material is selected from the group consisting of:

transition metals;

oxides of transition metals;

carbonates of transition metals;

phosphates of transition metals; and mixtures thereof, wherein the transition metal is selected from the group consisting of Fe, Co, Ni, Mn, Cu, V, Ti, Cr, and mixtures thereof.

7. The method of claim 1 wherein the particulate reducing agent is selected from the group consisting of:

transition metal constituents;

non-transition metals;

non-metal constituents; and mixtures thereof.

8. The method of claim 1 wherein the at least one lithium compound is lithium fluoride, and the resulting compound is a lithium metal fluorophosphate reaction product having the nominal formula $LiMPO_4F$, where M is a metal selected from the group consisting of iron, cobalt, nickel, copper, chromium, titanium, vanadium, manganese, and mixtures thereof.

9. The method of claim 8 wherein the lithium metal fluorophosphate reaction product has a triclinic structure.

10. The method of claim 8 wherein the at least one phosphate compound is capable of at least partial reduction and the at least one first metal constituent is selected from the group consisting of:

transition metals;

oxides of transition metals;

phosphates of transition metals;

carbonates of transition metals; and mixtures thereof.

11. The method of claim 8 wherein the at least one phosphate compound is selected from the group consisting of diammonium hydrogen phosphate, ammonium dihydrogen phosphate, lithium dihydrogen phosphate, transition metal phosphates, and mixtures thereof.

12. The method of claim 8 wherein the at least one metal constituent is iron oxide, the at least one phosphate compound is selected from the group consisting of diammonium hydrogen phosphate, ammonium dihydrogen phosphate, and mixtures thereof, and the resulting reaction product is a lithium iron fluorophosphate represented by the nominal formula $LiFePO_4F$.

13. The method of claim 8 wherein the at least one metal constituent is chromium oxide, the at least one phosphate compound is selected from the group consisting of diammonium hydrogen phosphate, ammonium dihydrogen phosphate, and mixtures thereof, and the resulting reaction product is a lithium chromium fluorophosphate represented by the nominal formula $LiCrPO_4F$.

14. The method of claim 8 wherein the at least one metal constituent is titanium oxide, the at least one phosphate compound is selected from the group consisting of diammonium hydrogen phosphate, ammonium dihydrogen phosphate, and mixtures thereof, and the resulting reaction product is a lithium titanium fluorophosphate represented by the nominal formula $LiTiPO_4F$.

15. The method of claim 8 wherein the at least one metal constituent is manganese oxide, the at least one phosphate compound is selected from the group consisting of diammonium hydrogen phosphate, ammonium dihydrogen phosphate, and mixtures, and the resulting reaction product is a lithium manganese fluorophosphate represented by the nominal formula $LiMnPO_4F$.

16. The method of claim 1 wherein at least one fluoride compound is admixed with the at least one lithium compound, the at least one first metal constituent, and the at least one phosphate compound under conditions such that the resulting compound is a lithium metal fluorophosphate reaction product having the nominal formula $LiMPO_4F$, where M is a metal selected from the group consisting of iron, cobalt, nickel, copper, chromium, titanium, manganese, and mixtures thereof.

17. The method of claim 1 wherein the lithium compound is a compound selected from the group consisting of lithium fluoride, lithium dihydrogen phosphate, lithium carbonate, and mixtures thereof.

18. A method of making a lithium metal fluorophosphate compound comprising the steps of:

mixing starting materials in particle form, comprising at least one metal constituent, a lithium compound, a fluoride compound, and a phosphate compound; and heating the starting material mixture to a temperature sufficient to form a lithium metal fluorophosphate reaction product for use in making an electrode for a battery comprising lithium, said reduced metal ion, phosphate, and fluoride.

19. A method of making a lithium mixed metal fluorophosphate compound comprising the steps of:

mixing starting materials in particle form, comprising a first metal constituent, a second metal constituent, and at least one phosphate compound;

heating the starting material mixture with a reducing agent in a non-oxidizing atmosphere to a temperature sufficient to form a mixed metal phosphate reaction product comprising a first metal phosphate, and a second metal phosphate;

mixing, in particle form, said first metal phosphate reaction product with a lithium compound and a fluoride compound; and heating the resulting mixture to a temperature sufficient to form a lithium mixed metal fluorophosphate reaction product for use in making an electrode for battery, the lithium mixed metal fluorophosphate reaction product comprising the first metal, the second metal, phosphate, fluoride, and lithium, wherein the lithium mixed metal fluorophosphates reaction product is not $LiVPO_4F$.

20. A method of making a metal phosphate compound comprising the steps of:

mixing starting materials in particle form, the starting materials including at least one metal constituent, and at least one phosphate compound; and heating the starting material mixture with a reducing agent in a non-oxidizing atmosphere to a temperature sufficient to form a metal phosphate reaction product for use in making an electrode for a battery comprising a metal and phosphate anion.

21. The method of claim 20 further comprising:

mixing said metal phosphate in particulate form with a particulate lithium compound; and heating the ensuing mixture to a temperature sufficient to form a lithium metal phosphate compound, the lithium metal phosphate compound comprising a metal, a phosphate, and a lithium.

22. The method of claim 20 further comprising: mixing said metal phosphate in particulate form with a particulate lithium compound, and a particulate fluoride compound; and heating the ensuing mixture to a temperature sufficient to form a lithium metal fluorophosphate reaction product, the lithium metal fluorophosphate comprising a metal, a phosphate, a fluoride and a lithium.

23. The method of claim 20 further comprising:

mixing said metal phosphate in particulate form with lithium fluoride; and heating the ensuing mixture to a temperature sufficient to form a lithium metal fluorophosphate reaction product, the lithium metal fluorophosphate comprising a metal, a phosphate, a fluoride, and a lithium.

24. The method of claims 20, 21, 22, 23, wherein said metal constituent is a compound of a metal selected from the group consisting of Fe, Co, Mn, V, Ti, Cr, Ni, Cu, and mixtures thereof.

25. The method of claim 23 where said metal constituent comprises iron oxide;

said one phosphate compound comprises diammonium hydrogen phosphate, or ammonium dihydrogen phosphate;

said metal phosphate reaction product comprises iron phosphate;

said lithium compound comprises lithium fluoride; and said lithium metal fluorophosphate reaction product comprises lithium iron fluorophosphate represented by the nominal formula $LiFePO_4F$.

26. The method of claim 23 wherein said metal constituent comprises chromium oxide;

said one phosphate compound comprises diaminonium hydrogen phosphate, or ammonium dihydrogen phosphate;

said metal phosphate reaction product comprises chromium phosphate;

said lithium compound comprises lithium fluoride; and said lithium metal fluorophosphate reaction product comprises lithium chromium fluorophosphate represented by the nominal formula $LiCrPO_4F$.

27. The method of claim 23 where said metal constituent comprises titanium oxide;

said one phosphate compound comprises diammonium hydrogen phosphate, or ammonium dihydrogen phosphate;

said metal phosphate reaction product comprises titanium phosphate;

said lithium compound comprises lithium fluoride; and said lithium metal fluorophosphate reaction product comprises lithium titanium fluorophosphate represented by the normal formula $LiTiPO_4F$.

28. The method of claim 23 where said metal constituent comprises vanadium pentoxide;

said one phosphate compound comprises diammonium hydrogen phosphate, or ammonium dihydrogen phosphate;

said metal phosphate reaction product comprises vanadium phosphate;

said lithium compound comprises lithium fluoride; and said lithium metal fluorophosphate reaction product comprises lithium vanadium fluorophosphate represented by the nominal formula $LiVPO_4F$.

29. The method of claim 23 where said metal constituent comprises manganese oxide;

said one phosphate compound comprises diammonium hydrogen phosphate, or ammonium dihydrogen phosphate;

said metal phosphate reaction product comprises manganese phosphate;

said lithium compound comprises lithium fluoride; and said lithium metal fluorophosphate reaction product comprises lithium manganese fluorophosphate represented by the nominal formula $LiMnPO_4F$.

30. The method of claim 23 wherein said reducing agent is selected from the group consisting of:

transition metals;

non-transition metals;

non-metal constituents; and mixtures thereof.

31. A method of making a lithium transition metal oxide compound for use as a cathode active material comprising the steps of:

admixing starting materials in particle form, including at least one lithium compound, at least one transition metal oxide compound, and at least one particulate reducing agent; and heating the starting material mixture in a non-oxidizing atmosphere to a temperature sufficient to form a lithium transition metal oxide reaction product.

32. The method of claim 31 wherein the metal in the at least one transition metal oxide is selected from the group consisting of V, Fe, Mn, Cr, Cu, and mixtures thereof.

33. The method of claim 31 wherein the particulate starting material further includes at least one second metal constituent from the group consisting of Fe, Mn, V, Cr, Cu, and mixtures thereof.

34. The method of claim 31 wherein the particulate reducing agent is selected from the group consisting of:

transition metal constituents;

non-transition metals;

non-metal constituents; and mixtures thereof.

35. The method of claim 3 wherein the transition metal phosphate is selected from the group consisting of $Mn_3(PO_4)_2$, $FePO_4$, $Fe_3(PO_4)_2$, $Zn_3(PO_4)_2$, $TiPO_4$, $CrPO_4$, $Mg_3(PO_4)_2$, and mixtures thereof.

* * * * *

UNITED STATES PATENT AND TRADEMARK OFFICE
CERTIFICATE OF CORRECTION

| | | |
|---|---|---|
| PATENT NO. | : 6,960,331 B2 | |
| APPLICATION NO. | : 10/683643 | |
| DATED | : November 1, 2005 | |
| INVENTOR(S) | : Jeremy Barker, M. Yazid Saidi and Jeffrey Swoyer | |

It is certified that error appears in the above-identified patent and that said Letters Patent is hereby corrected as shown below:

Column 3 Line 9
Delete "$Li_{1-y}MPO_4F$"
Insert -- $Li_{1-x}MPO_4F$ --

Column 14 Line 58
Delete "$\rightarrow_{VPO4}$"
Insert -- $\rightarrow VPO_4$ --

Column 15 Line 42
Delete "3000° C"
Insert -- 300° C --

Column 17 Line 44
Delete "$TiRO_4$"
Insert -- $TiPO_4$ --

Column 20 Line 32
Delete "+0.5 $Ca_2$"
Insert -- +0.5 $Co_2$ --

Signed and Sealed this
Fourteenth Day of June, 2011

David J. Kappos
*Director of the United States Patent and Trademark Office*